US011500198B2

(12) United States Patent
Lee et al.

(10) Patent No.: US 11,500,198 B2
(45) Date of Patent: Nov. 15, 2022

(54) WAVEGUIDE BUS WITH BALANCED OPTICAL WAVEGUIDES AND METHOD, SYSTEM, AND SOFTWARE TOOL FOR AUTOMATIC GENERATION OF A LAYOUT FOR THE WAVEGUIDE BUS

(71) Applicant: GLOBALFOUNDRIES U.S. Inc., Santa Clara, CA (US)

(72) Inventors: Won Suk Lee, Malta, NY (US); Thomas G. Weeks, III, Burnsville, MN (US); Michal Rakowski, Ballston Lake, NY (US); Yusheng Bian, Ballston Lake, NY (US); Roderick A. Augur, Saratoga Springs, NY (US); Alexander L. Martin, Greenfield Center, NY (US); Petar I. Todorov, Sofia (BG)

(73) Assignee: GlobalFoundries U.S. Inc., Malta, NY (US)

( * ) Notice: Subject to any disclaimer, the term of this patent is extended or adjusted under 35 U.S.C. 154(b) by 158 days.

(21) Appl. No.: 17/146,509

(22) Filed: Jan. 12, 2021

(65) Prior Publication Data
US 2022/0221714 A1    Jul. 14, 2022

(51) Int. Cl.
*G02B 27/00*    (2006.01)
*G02B 6/125*    (2006.01)

(52) U.S. Cl.
CPC ......... *G02B 27/0012* (2013.01); *G02B 6/125* (2013.01)

(58) Field of Classification Search
None
See application file for complete search history.

(56) References Cited

U.S. PATENT DOCUMENTS

| | | | |
|---|---|---|---|
| 6,219,471 B1 * | 4/2001 | Doerr | G02B 6/12023 385/39 |
| 10,503,865 B2 | 12/2019 | Alloatti | |
| 2012/0224812 A1 * | 9/2012 | Inoue | H04L 27/2096 385/45 |

(Continued)

FOREIGN PATENT DOCUMENTS

| | | | | |
|---|---|---|---|---|
| EP | 1020740 A1 * | 7/2000 | ......... | G02B 6/12011 |
| WO | WO-2011115285 A1 * | 9/2011 | ......... | G02B 6/12007 |

OTHER PUBLICATIONS

Synopsis PhoeniX OptoDesigner User Manual, "OptoDesigner Photonic Chip and Mask Layout", https://www.synopsys.com/photonic-solutions/pic-design-suite/photonic-chip-mask-layout/autorouting.html, Accessed on Sep. 22, 2020, pp. 1-4.

(Continued)

*Primary Examiner* — Chris H Chu
(74) *Attorney, Agent, or Firm* — Anthony Canale; Hoffman Warnick LLC

(57) ABSTRACT

Disclosed are a system, method, software tool, etc. for generating a layout indicating the paths for balanced optical waveguides (WGs) of a WG bus. A grid is used to route paths, which extend between corresponding first and second input/output nodes, respectively, and which are within boundaries of a defined area. The paths are automatically rerouted to balance for length and number of bends without overly increasing the lengths of or number of bends in those paths and further without moving the input/output nodes or falling outside the established boundaries. Automatic rerouting of the paths is performed iteratively based on results of various intersection operations related to different path-specific sets of points on the grid to determine when and where to insert additional linear segments and bends into the paths. Then, a layout indicating the balanced paths is generated. Also disclosed is a WG bus structure with balanced optical WGs.

20 Claims, 17 Drawing Sheets

(56) References Cited

U.S. PATENT DOCUMENTS

| | | | | |
|---|---|---|---|---|
| 2014/0007032 A1* | 1/2014 | Acar | ..................... | G06F 30/398 716/112 |
| 2020/0284980 A1 | 9/2020 | Qi et al. | | |
| 2021/0311336 A1* | 10/2021 | Kharel | .................. | G02F 1/2255 |

OTHER PUBLICATIONS

Boos et al., "PROTON: An Automatic Place-and-Route Tool for Optical Networks-On-Chip", IEEE/ACM International Conference on Computer-Aided Design (ICCAD), 2013, pp. 138-145.

Krishna et al., "Automatic Place-and-Route of Emerging LED-Driven Wires Within a Monolithically-Integrated CMOS +III-V Process", IEEE, Design, Automation & Test in Europe Conference & Exhibition 2017, pp. 344-349.

Mcclellan, Paul, "Yoga is Passe, the Future is CurvyCore", https://community.cadence.com/cadence_blogs_8/b/breakfast-bytes/posts/curvycore, 2018, Accessed on Sep. 21, 2020, pp. 1-6.

Giewont et al., "300-mm Monolithic Silicon Photonics Foundry Technology", IEEE Journal of Selected Topics in Quantum Electronics, vol. 25, No. 5, 2019, pp. 1-12.

Rakowski et al., "45nm CMOS-Silicon Photonics Monolithic Technology (45CLO) for Next-Generation, Low Power and High Speed Optical Interconnects", OSA Technical Digest (Optical Society of America), 2020, pp. 1-3.

Globalfoundries, Silicon Photonics Platform, Japan SOI Design Workshop, 2018, pp. 1-16.

Moughames et al., "Three Dimensional Waveguide-Interconnects for Scalable Integration of Photonic Neural Networks", Optica 7, arXiv:1912.08203v1, 2019, pp. 1-7.

Khan et al., "Photonic Integrated Circuit Design in a Foundry+ Fabless Ecosystem", IEEE Journal of Selected Topics in Quantum Electronics, vol. 25, No. 5, 2019, pp. 1-14.

Kruse et al., "Fan-Out Routing and Optical Splitting Techniques for Compact Optical Interconnects Using Single-Mode Polymer Waveguides", Journal of Modern Optics, vol. 62, No. S2, 2015, 1-10.

Nesic et al., "Hybrid 2D/3D Photonic Integration for Non-Planar Circuit Topologies", Optics Express vol. 27, Issue 12, arXiv:1901.08309, 2019, pp. 1-22.

Yu et al., "Intra-Chip Optical Interconnection Based on Polarization Division Multiplexing Photonic Integrated Circuit", Optics Express 28330, vol. 25, No. 23, 2017, pp. 1-7.

* cited by examiner

BEFORE

AFTER

BEFORE

AFTER

BEFORE

AFTER

BEFORE

AFTER

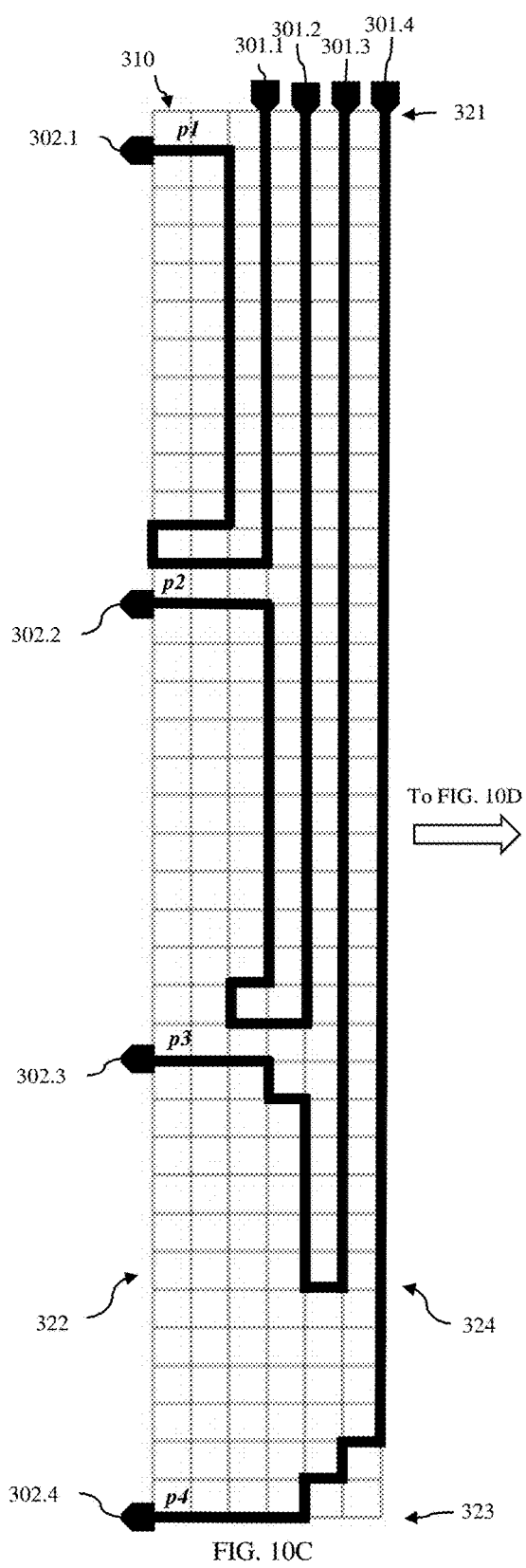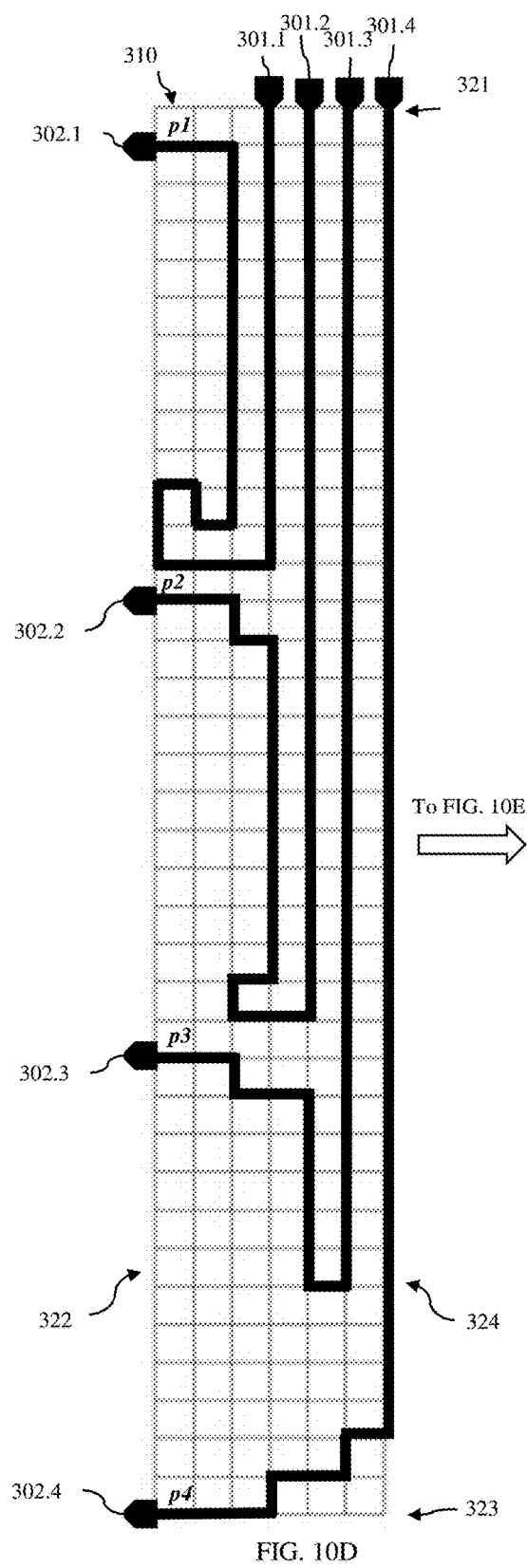
FIG. 10C
FIG. 10D

WAVEGUIDE BUS WITH BALANCED OPTICAL WAVEGUIDES AND METHOD, SYSTEM, AND SOFTWARE TOOL FOR AUTOMATIC GENERATION OF A LAYOUT FOR THE WAVEGUIDE BUS

BACKGROUND

Field of the Invention

The present invention relates to optical waveguides and, more particularly, to embodiments of a design method, system, and software tool for automatically generating a layout for a waveguide bus and to embodiments of a waveguide bus manufactured according to the layout.

Description of Related Art

More specifically, a silicon photonic integrated chip (PIC) may include an optical waveguide (WG) bus (i.e., a set of optical WGs). Each of the WGs in the WG bus transmit an optical signal between a pair of input/output nodes. During PIC design, the paths for the optical WGs are automatically laid out (e.g., by a WG layout generation tool) based on design rules that are directed to, for example, critical dimensions, minimizing area consumption, etc. Typically, each path in the resulting automatically generated layout will have the shortest length and fewest number of bends possible between its corresponding input/output nodes. However, some PIC designs require the WGs in a WG bus to be balanced. For purpose of this disclosure, "balanced WGs" refers to WGs that subject optical signals passing therethrough to essentially the same transmission loss and phase shifting. Those skilled in the art will recognize that transmission loss and phase shifting of an optical signal passing through a WG will be dependent upon both the length of the WG and the number of bends within the WG. That is, both transmission loss and phase-shifting are length and bend-induced. Typically, if balanced WGs are required, a layout is automatically generated (e.g., as described above, with each path having the shortest length and fewest number of bends possible between its corresponding input/output nodes). Then, the lengths of one or more of the paths and/or the number of bends in one or more of the paths are changed manually so that all of the paths have approximately the same length and number of bends. Ideally, WG balancing is performed, not only to equalize transmission loss and phase shifting, but also to minimize transmission loss and phase shifting. Unfortunately, manually changing the paths of a layout with these goals in mind can be time consuming, inconsistent, prone to errors, etc.

SUMMARY

Disclosed herein are embodiments of a design system for automatically generating a layout indicating the paths for balanced optical waveguides (WGs) of a WG bus. The system can include a storage medium, which stores a design (e.g., a schematic diagram) that includes a WG bus with multiple optical WGs. The system can also include a processor, which is in communication with the storage medium. The processor can access the design from the storage medium and can, based on the design, route paths for the optical WGs. Specifically, the processor can route the paths such that they extend between corresponding first and second input/output nodes, respectively, and so that they are within defined boundaries of a rectangular-shaped area. The processor can further automatically reroute the paths in order to reduce any differences in total length and total number of bends between the paths (i.e., to balance the paths for length and number of bends). Specifically, the processor can insert additional linear segments, which are each equal to one unit of length, and/or additional bends, into at least one of the paths without moving any of the first and second input/output nodes and without falling outside the defined boundaries. Inserting the additional linear segments and/or the additional bends into the path(s) results in the creation of balanced paths. The technique and, particularly, the algorithm that is used to determine when and where to automatically insert the additional linear segments and/or the additional bends (as discussed further in the detailed description section below) ensures that the balanced paths extend between the same corresponding first and second input/output nodes as did the paths, are within the same defined boundaries, and minimal differences, if any, in length and the same number of bends. The processor can further generate a layout, which indicates the balanced paths for the optical WGs.

Also disclosed herein are embodiments of a design method for automatically generating a layout indicating the paths for balanced optical waveguides (WGs) of a WG bus. The method can include accessing, by a processor from a storage medium, a design (e.g., a schematic diagram) that includes a WG bus with multiple optical WGs. The method can further include routing, by the processor based on the design, paths for the optical WGs. The process of routing the paths can be performed so that the paths extend between corresponding first and second input/output nodes, respectively, and so that they are within defined boundaries of a rectangular-shaped area. The method can further include automatically rerouting, by the processor, the paths to reduce any differences in total length and total number of bends between the paths (i.e., to balance the paths for length and number of bends). The process of automatically rerouting the paths can include inserting, into at least one of the paths, additional linear segments, which are each equal to one unit of length, and/or additional bends without moving the first and second input/output nodes and without falling outside the defined boundaries. Inserting the additional linear segments and/or the additional bends into the path(s) results in the creation of balanced paths. The technique and, particularly, the algorithm that is used to determine when and where to automatically insert the additional linear segments and/or the additional bends (as discussed further in the detailed description section below) ensures that the balanced paths extend between the same corresponding first and second input/output nodes as did the paths, are within the same defined boundaries, and have minimal differences, if any, in length and the same number of bends. The method can also include generating, by the processor, a layout that indicates the balanced paths for the optical WGs.

Also disclosed herein are embodiments of a computer program product. The computer program product can include a computer readable storage medium, which has, embodied therewith, at least a software tool with program instructions for waveguide (WG) layout generation. The program instructions for waveguide layout generation can be readable by a processor, which can execute the instructions in order to perform the above-describe method for automatically generating a layout indicating the paths for balanced optical waveguides (WGs) of a WG bus.

Also disclosed herein are embodiments of a structure (e.g., a silicon photonic integrated circuit (PIC) chip). The structure can include a substrate and, on the substrate, a waveguide (WG) bus with multiple optical WGs. The optical WGs can, for example, be WGs that were manufactured according to a specific layout, which was automatically generated by any of the above-described system, method or computer program product embodiments. Specifically, the WG bus can be within a rectangular-shaped area with defined boundaries. The WG bus can include multiple optical WGs. The optical WGs can extend between corresponding first and second input/output nodes, respectively. The first and second input/output nodes for the different WGs can be separated by different distances. That is, a first WG can extend between first and second input/output nodes that are separated by a first distance; a second WG can extend between different first and second output nodes that are separated by a second distance that is greater than the first distance; and so on. The optical WGs can include different combinations of linear sections and bends so that the total lengths of the optical WGs are within a threshold difference in number of units of length and so that the total numbers of bends in the optical WGs are equal. Finally, because the WG bus has been manufactured according to a layout automatically generated by any of the above-described system, method, or computer program product embodiments, one specific optical WG, which extends between first and second input/output nodes that are separated by the longest distance, can include a specific combination of linear sections and bends and this specific combination can include a cascade of bends with a stepped shape.

BRIEF DESCRIPTION OF THE SEVERAL VIEWS OF THE DRAWINGS

The present invention will be better understood from the following detailed description with reference to the drawings, which are not necessarily drawn to scale and in which:

FIGS. 10A-10E are diagrams illustrating, in greater detail, iterative processing employed for automatic rerouting of the paths for the optical WGs from those shown in FIG. 3 to those shown in FIG. 4;

DETAILED DESCRIPTION

As mentioned above, a silicon photonic integrated chip (PIC) may include an optical waveguide (WG) bus (i.e., a set of optical WGs). Each of the WGs in the WG bus transmit an optical signal between a pair of input/output nodes. During PIC design, the paths for the optical WGs are automatically laid out (e.g., by a WG layout generation tool) based on design rules that are directed to, for example, critical dimensions, minimizing area consumption, etc. Typically, each path in the resulting automatically generated layout will have the shortest length and fewest number of bends possible between its corresponding input/output nodes. However, some PIC designs require the WGs in a WG bus to be balanced. For purpose of this disclosure, "balanced WGs" refers to WGs that subject optical signals passing therethrough to essentially the same transmission loss and phase shifting. Those skilled in the art will recognize that transmission loss and phase shifting of an optical signal passing through a WG will be dependent upon both the length of the WG and the number of bends within the WG. That is, both transmission loss and phase-shifting are length and bend-induced. Typically, if balanced WGs are required, a layout is automatically generated (e.g., as described above, with each path having the shortest length and fewest number of bends possible between its corresponding input/output nodes). Then, the lengths of one or more of the paths and/or the number of bends in one or more of the paths are changed manually so that all of the paths have approximately the same length and the same number of bends. Ideally, WG balancing is performed, not only to equalize transmission loss and phase shifting, but also to minimize transmission loss and phase shifting. Unfortunately, manually changing the paths of a layout with these goals in mind can be time consuming, inconsistent, prone to errors, etc.

Figure 1A:
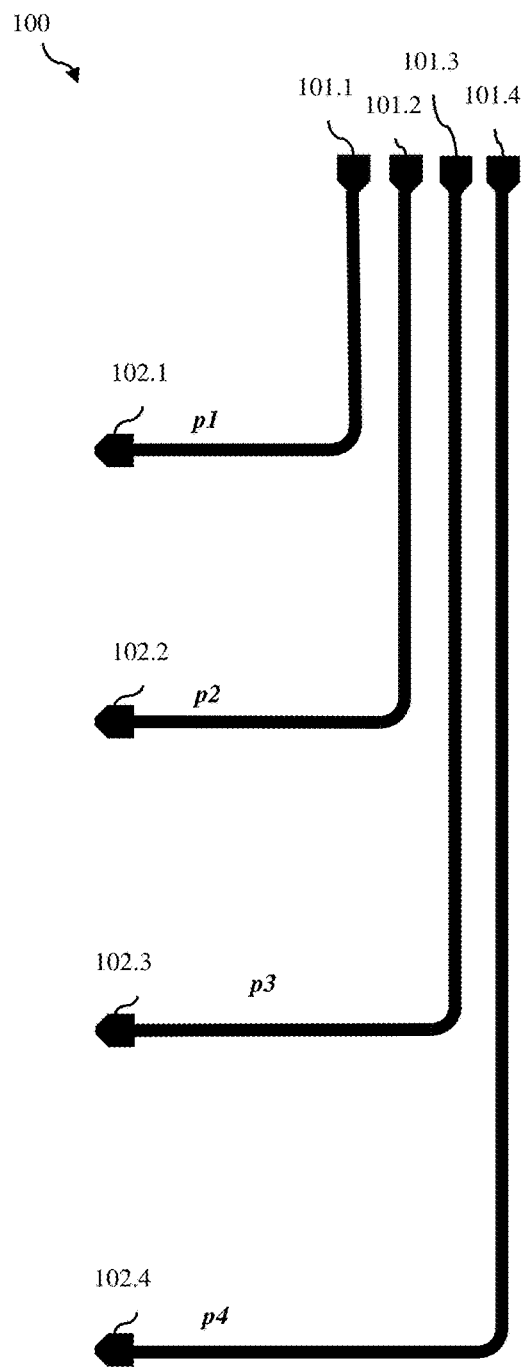
FIG. 1A is a diagram illustrating an automatically generated layout showing four paths for four optical waveguides (WGs) of a WG bus.
Figure 1B:
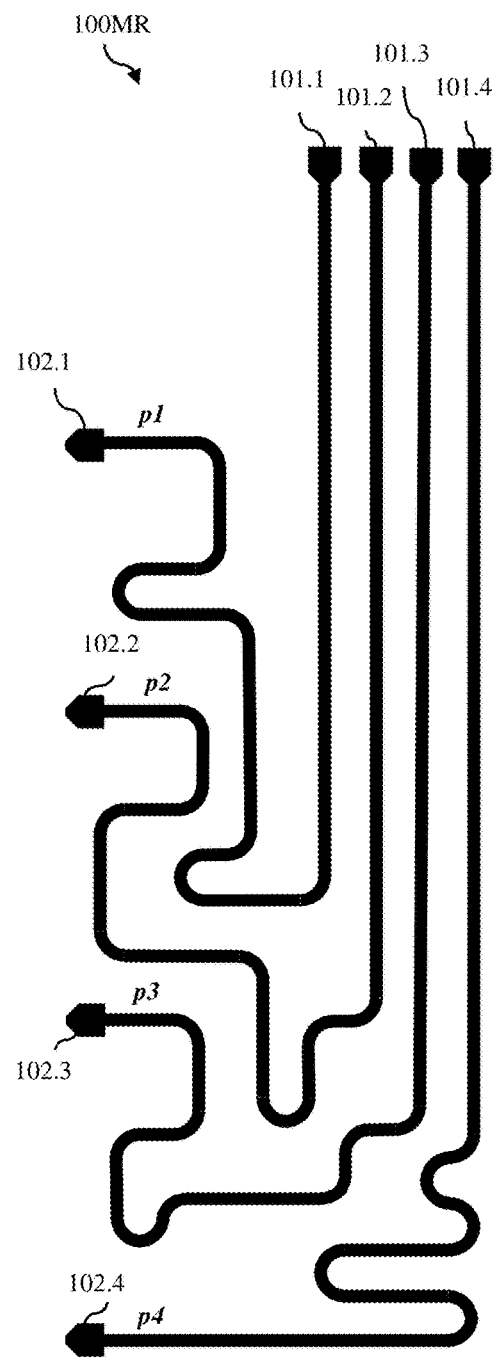
FIG. 1B is a diagram illustrating an exemplary revised layout where the paths shown in FIG. 1A have been manually rerouted.

For example, FIG. 1A is a diagram illustrating an exemplary automatically generated layout 100 showing four paths p1-p4 for four optical WGs of a WG bus. Layout generation (e.g., by a conventional WG layout tool) is performed following placement of first and second input/output nodes for each of the paths (e.g., see first input/output nodes 101.1-101.4 for the paths p1-p4 and the second input/output nodes 102.1-102.4 for the paths p1-p4). As illustrated, the first input/output nodes 101.1-101.4 and the second input/output nodes 102.1-102.4 have been placed so that the first input/output nodes are all aligned in a first direction and so that the second input/output nodes are all aligned in a second direction that is perpendicular to the first direction. Routing of the paths between corresponding first and second input/output nodes is typically based on design rules directed to CDs, etc. so that each path follows the shortest route with the least number of bends possible between its first and second input/output nodes. As a result, at least the lengths of the paths are different (e.g., the length of p4 is greater than the length of p3, the length of p3 is greater than the length of p2, and so on). Thus, if a WG bus is manufactured according to this automatically generated layout, optical signals passing through the different optical WGs will be subjected to different amounts of transmission loss and phase-shifting. FIG. 1B is a diagram illustrating an exemplary manually revised layout 100MR in which the paths p1-p4 for the optical WGs of the WG bus have been manually rerouted in an attempt to balance them (i.e., in an attempt to make them all equal in length with the same number of bends) without moving the input/output nodes. While these manually rerouted paths p1-p4 all have the same number of bends (i.e., nine bends), the lengths may still vary, the solution is random and, alternative solutions where the paths p1-p4 are smaller in length and/or have fewer bends are likely.

In view of the foregoing, disclosed herein are embodiments of a design system, method, software tool, etc. for automatically generating a layout indicating the paths for balanced optical waveguides (WGs) of a WG bus. Specifically, these embodiments can use a grid to route paths of the optical WGs, which extend between corresponding first and second input/output nodes, respectively, and which are within the boundaries of a defined area. These embodiments can further automatically reroute the paths in order to reduce any differences in length and number of bends (i.e., to balance the paths for length and number of bends) without overly increasing the lengths of or number of bends in those paths and further without moving the input/output nodes or falling outside the previously established boundaries. Automatic rerouting of the paths can be performed, for example, using an algorithm that employs iterative processing and the results of various intersection operations related to different path-specific sets of points on the grid to determine when and where to insert additional linear segments and bends into the paths. Finally, these embodiments can generate a layout indicating the balanced paths for the optical WGs. Also disclosed herein are embodiments of a structure, which includes a WG bus with balanced optical WGs and which has been manufactured according to the automatically generated layout described above.

Figure 2:
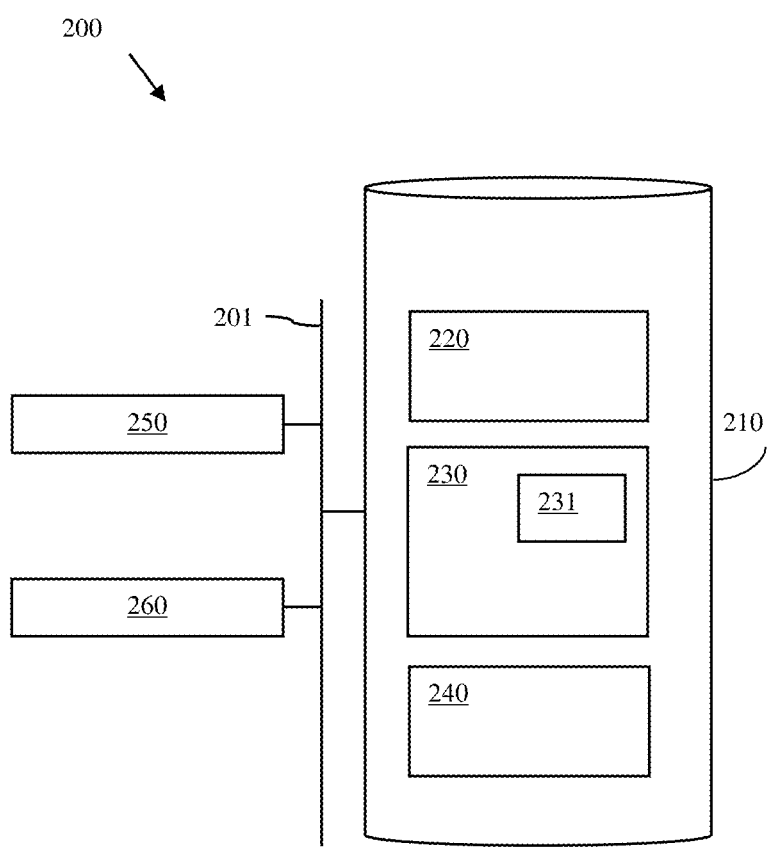
FIG. 2 is a schematic diagram illustrating disclosed embodiments of a computer-aided design (CAD) system for automatically generating a layout indicating paths for balanced optical WGs of a WG bus.

More particularly, FIG. 2 is a schematic diagram illustrating disclosed embodiments of a computer-aided design (CAD) system 200. The CAD system 200 can include multiple system components. These system components can include, but are not limited to, one or more processors 250, one or more monitors 260, and one or more computer readable storage mediums 210. The system components can be interconnected over a system bus 201 (as illustrated) and/or over a wired or wireless network (not shown). For purposes of illustration, the CAD system 200 is described below and illustrated in FIG. 2 as having a single processor and a single storage medium. However, it should be understood that FIG. 2 is not intended to be limiting. Alternatively, the CAD system 200 could incorporate multiple processors for performing one or more of the different processes in a design flow and/or multiple storage mediums, which are accessible by the processor(s) and which store the required data, software tools, etc. for performing the different processes in the design flow.

The storage medium 210 can store electronic design automation (EDA) tool(s) 230 (e.g., specialized software program(s)). Each EDA tool 230 includes program instructions that are executable by the processor 250 to cause the processor 250 to perform process steps in the computer-aided design flow. At least one of the EDA tools 230 stored by storage medium 210 and accessible by the processor 250 can be a novel waveguide (WG) layout generation tool 231 (also referred to herein as a WG layout generator), as described in greater detail below.

The storage medium 210 can further store general design information 240, which is accessible and usable by one or more of the EDA tools 230 during performance of the process steps. The design information 240 can be in the form, for example, of a process design kit (PDK). In any case, the design information 240 can include, but is not limited to, technology files for a specific technology node, design rule decks for the specific technology node, various libraries, etc. Those skilled in the art will recognize that, generally, technology files for a specific technology node refer to files that define the layers and devices that are available in the specific technology node for a particular fabrication process as well as the generic physical and electrical rules for the specific technology node. Design rule decks for a specific technology node refer to discrete sets of design rules (also called run sets). Each rule deck includes a set of design rules that are applicable to one or more of the particular processes in the design flow. The design rules are determined based on process assumptions associated with the specific technology node at issue and on various fail mechanisms that can occur in light of those process assumptions.

The storage medium 210 can further store a preliminary design 220 (e.g., a schematic or elementary diagram) for a silicon photonics integrated circuit (PIC) or portion thereof, which is accessible by the processor 250. This preliminary design 220 show at least one waveguide (WG) bus with multiple optical WGs that, by design, should be balanced. Such a schematic or elementary diagram can, for example, show by means of graphic symbols the connections and functions of the WG bus without regard to the actual physical layout. As mentioned, one of the EDA tools 230 stored on the storage medium 210 and accessible by the processor 250 can be a novel waveguide (WG) layout generation tool 231 (also referred to herein as a WG layout generator). The WG layout generator 231 can includes program instructions for WG layout generation and specifically program instructions for automatically generating a layout, which will indicate paths for balanced optical WGs of a WG bus.

Thus, in the disclosed system 200, the processor 250 can execute the program instructions of the WG layout generator 231, thereby causing the processor 250 to automatically generate a layout, which represents the paths for the optical waveguides (WGs) of the WG bus referenced in the PIC design 220, in a manner that ensures that the optical WGs will be essentially balanced for minimal transmission loss and phase shifting. That is, when a WG bus in manufactured according to the layout, optical signals passing through the optical WGs will be subjected to essentially the same transmission loss and phase shifting and the transmission loss and phase shifting will be minimized.

Specifically, the processor 250 can access the PIC design 220 (or the portion thereof that shows the WG bus) from the storage medium 210. Based the design 220, the processor 250 can route (i.e., establish placement of) paths for the optical WGs of the WG bus, respectively (e.g., see exemplary paths p1-p4 shown in FIG. 3). For purposes of illustration, four paths for four optical WGs are shown in the figures; however, it should be understood that, depending upon the PIC design 220, there could be any number of two or more paths for any number of two or more optical WGs in the WG bus.

In any case, to route the paths p1-p4, the processor 250 can form a grid 310 (e.g., a cartesian grid) of cells 311, which are arranged in columns and rows. The cells 311 can be square-shaped and identical in size. The side length of each cell can correspond to one unit of length (UL) for purposes measuring the total lengths of the paths and this one UL should be equal to two times the fixed bend radius (BR). For purposes of this invention, the bends in the optical WGs of the WG bus can all have the same fixed arc angle ($\theta$) of 90 degrees, the same fixed BR, and the same fixed arc length (S). The $\theta$, BR and S can be specified in the design information 240 or the design 220. The outer lines of the grid 310 can define the side boundaries of a rectangular-shaped area within which the paths p1-p4 are to be routed (e.g., see the top side boundary 321, the left side boundary 322, the bottom side boundary 323 and the right side boundary 324). Finally, the numbers of columns and rows within the grid 310 can define the size (i.e., width and length, respectively, as measured in UL) of this rectangular-shaped area.

Figure 3:
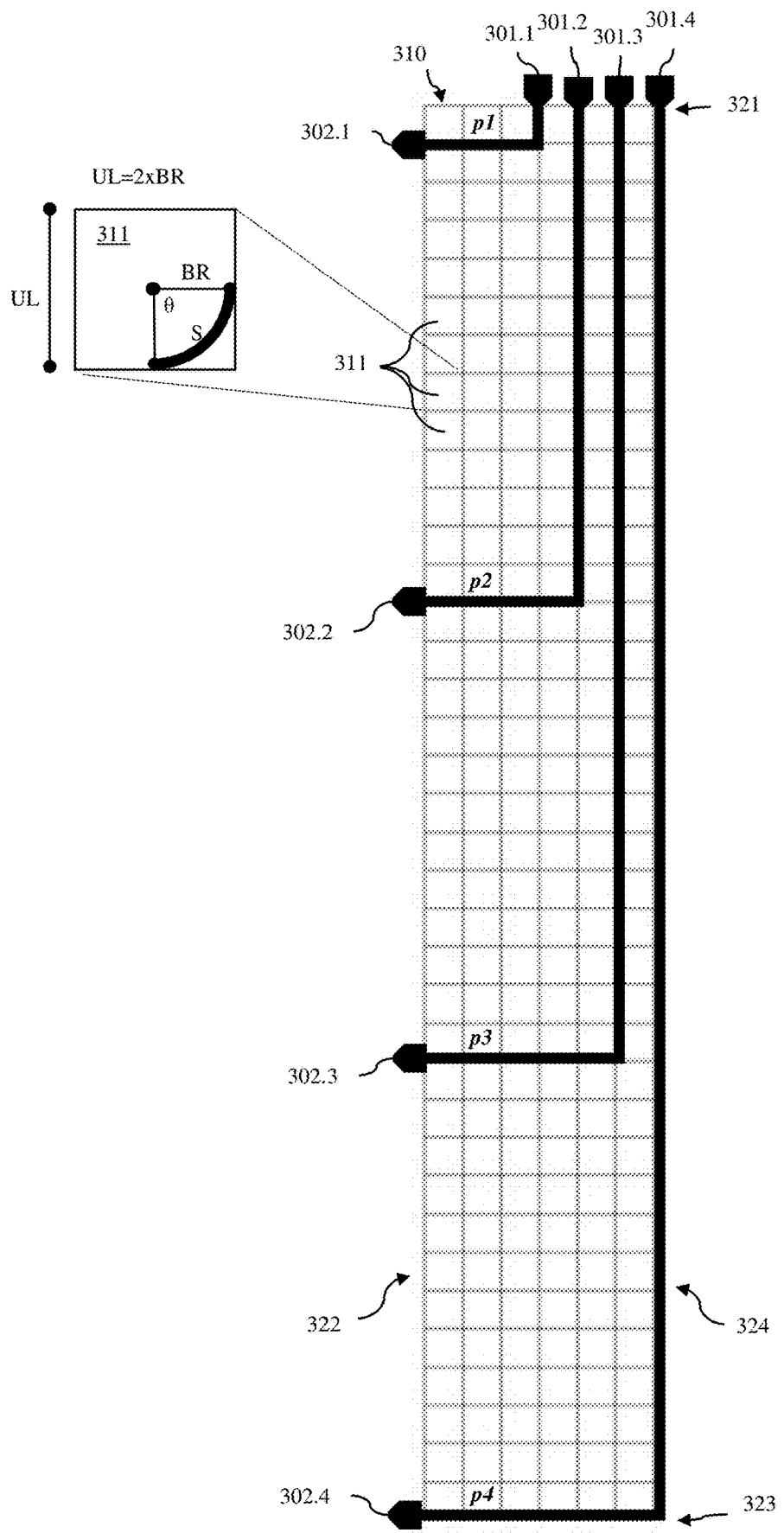
FIG. 3 is a diagram illustrating initial placement of paths for optical WGs of a WG bus according to the disclosed embodiments.

The processor 250 can place first and second input/output nodes for each of the optical WGs, respectively, on the grid 310. First and second input/output node placement can be performed so that the first input/output nodes 301.1-301.4 for the optical WGs (and thereby for paths p1-p4, respectively) are placed at different grid points on one side boundary of the rectangular-shaped area and such that the second input/output nodes 302.1-302.4 for the optical WGs (and thereby for paths p1-p4, respectively) are placed at different grid points of an adjacent side boundary of the rectangular-shaped area, which is perpendicular to the side boundary having the first input/output nodes 301.1-301.4. For example, the first input/output nodes 301.1-301.4 can be placed at different grid points on the top side boundary 321 and the second input/output nodes 302.1-302.4 can be placed at different grid points on the left side boundary 322. Placement and, particularly, spacing of the first input/output nodes 301.1-301.4 on the top side boundary 321 of the grid 310 and placement and, particularly, spacing of the second input/output nodes 302.1-302.4 on the left side boundary 322 can be based on the design 220 as well as on design rules in the design information 240 (e.g., design rules that specify CD). Thus, the pitch of the first input/output nodes 301.1-301.4 may be the same as or different from (e.g., less or greater than) the pitch of the second input/output nodes 302.1-302.4. For example, as illustrated, first input/output nodes 301.1-301.4 have a smaller pitch (e.g., a one UL pitch) than the second input/output nodes 302.1-302.4 (e.g., a 12 UL pitch). As mentioned above, each UL is equal to the side length of one cell 311 within the grid 310. Each first input/output node 301.1-301.4 in order from left to right can be paired with a second input/output node 302.1-302.4 in order from top to bottom. Thus, the separation distances between each pair of first and second input/output nodes for each optical WG will become progressively larger. For example, as illustrated in FIG. 3, the first and second input/output nodes 301.1/302.1 for the first optical WG will have the shortest separation distance; the first and second input/output nodes 301.2/302.2 for the second optical WG will have the next shortest separation distance; and so on with the first and second input/output nodes 301.4/302.4 for the fourth optical WG having the longest separation distance.

After first and second input/output node placement, the processor 250 can route the paths p1-p4 for the optical WGs on the grid 310 so that each path extends between corresponding first and second input/output nodes, respectively. That is, the paths can be routed so that a first path p1 extends between first and second input/output nodes 301.1-302.1, so that a second path p2 extends between first and second input/output nodes 301.2-302.2, and so on. These paths p1-p4 can be routed so that they are aligned with and extend along the vertical and horizontal lines of the grid 310 with each path typically following the shortest route with the smallest number of ninety degree turns between its first and second input/output nodes.

It should be understood that the routing is performed such that the paths do not cross each other and such that critical distance design rules are not violated (e.g., such that paths remain separated by at least a minimum separation distance). It should also be noted that, during routing, each ninety degree turn of a path on the grid 310 corresponds to one bend in an optical WG. That is, while, as indicated above, the actual bends in the optical WG will have an arc angle of ($\theta$), a same fixed bend radius (BR) and a same fixed arc length (S), in order to reduce complexity during routing these bends are snapped to the cell corners. Thus, for example, as illustrated in FIG. 3, path p1 between the first and second input/output nodes 301.1-302.1 has a length of 4 UL and one ninety degree turn representing one bend. Path p2 between the first and second input/output nodes 301.2-302.2 has a length of 17 UL and one ninety degree turn representing one bend. Path p3 between the first and second input/output nodes 301.3-302.3 has a length of 30 UL and one ninety degree turn representing one bend. Finally, path p4 between first and second input/output nodes 301.4-302.4 has a length of 42 UL and one ninety degree turn representing one bend. Thus, while the paths p1-p4 have the same number of ninety degree turns (i.e., bends), they have different lengths.

Figure 4:
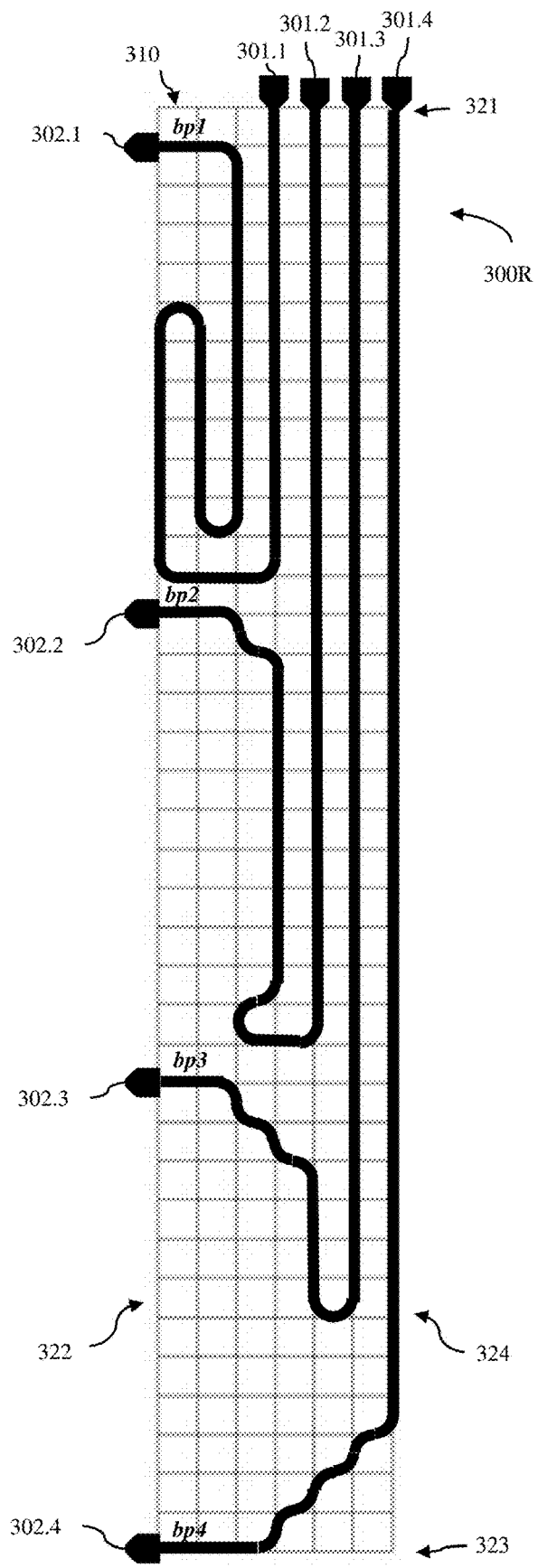
FIG. 4 is a diagram illustrating automatically rerouted paths where differences in total length and total number of bends have been reduced according to the disclosed embodiments.

The processor 250 can further automatically reroute the paths p1-p4 in order to reduce any differences in total length and total number of bends between the paths and then generate a layout 400 indicating the balanced paths bp1-bp4 for the optical WGs, as illustrated in FIG. 4. For purpose of this disclosure, "balanced paths" refer to paths where the lengths of the paths are all within a preset threshold length difference (e.g., a length difference of less than 1 UL (ideally), a length difference of less than 2 UL, a length difference of less than 3 UL, etc.) and where the numbers of bends in the paths are all equal (i.e., the difference in the number of bends is 0).

Specifically, the processor 250 can insert additional linear segments, which are each equal to one UL, and/or additional bends, into at least one of the paths without moving first and second input/output nodes and without falling outside the defined boundaries. Inserting the additional linear segments and/or the additional bends into the path(s) results in the creation of balanced paths. The technique and, particularly, the algorithm that is used to determine when and where to automatically insert the additional linear segments and/or the additional bends specifically ensures that the balanced paths bp1-bp4 extend between the same corresponding pairs of first and second input/output nodes 301.1/302.1, 301.2/302.2, 301.3/302.3 301.4-302.4 as did the paths p1-p4, are within the same defined boundaries 321-324 of the grid 310 and have minimal differences, if any, in length and the same number of bends. Furthermore, the technique can be employed to achieve the shortest length and/or fewest number of bends possible for each path.

More specifically, in order to balance the paths p1-p4 (e.g., as shown in FIG. 3) for length and number of bends and to generate a layout 400 (e.g., as shown in FIG. 4) with balanced paths bp1-bp4, the processor 250 can reroute the paths p1-p4 in an iterative manner given the following data sets, integers and rules applicable thereto:

Data sets and Integers:

P is the set of all paths $p_i$ (initially indexed by length such that $p_1$ is the shortest path of the paths and $p_{|P|}$ is the longest path).

$A_i$ is the set of all grid points on path $p_i$. $B_i$ is the set of all bends (i.e., 90 degree turn or corners) on path $p_i$.

$S_i$ is the set of all grid points of a selected cell (i.e., a selected square so $|S_i|=4$), which can is on path $p_i$ and extends a bend b that is an element of the $B_i$.

K is the set of differences $k_i$ between the number of bends in the bendiest path and the number of bends in path $p_i$.

|P| is the actual number of paths.

$l_i$ is the difference in units of length (UL) between the length of the longest path and the length of path $p_i$.

$k_i$ is the difference between the number of bends in the bendiest path and the number of bends in path $p_i$.

Rules:

Rule 1: Path Length Difference Update: XOR ($B_i$, $S_i$) updates $l_i$ by $2\times(3-|A_i \cap S_i|)$;

Rule 2: $|B_i \cap S_i|$ Lower/Upper Bounds: $|A_i \cap S_i|-2 \leq |B_i \cap S_i| \leq |A_i \cap S_i|$;

Rule 3: Path Number of Bends Update: XOR ($B_i$, $S_i$) updates $|B_i|$ by $2\times(2-|B_i \cap S_i|)$.

Thus, for any specific path $p_i$ under consideration, the above-mentioned rules can be applied in order to make insertions of additional linear segments and/or insertions of additional bends into the specific path $p_i$ on the grid 310 and these insertion will be based on the results of both an intersection operation between a set of all grid points on the specific path (i.e., set $A_i$) and a set of all corners of a specific cell that has at least one corner aligned with at least one bend in the specific path (i.e., set $S_i$) and an intersection operation between a set of all bends in the specific path (i.e., set $B_i$) and the set of all corners of the specific cell (i.e., the same set $S_i$).

Figure 5A:
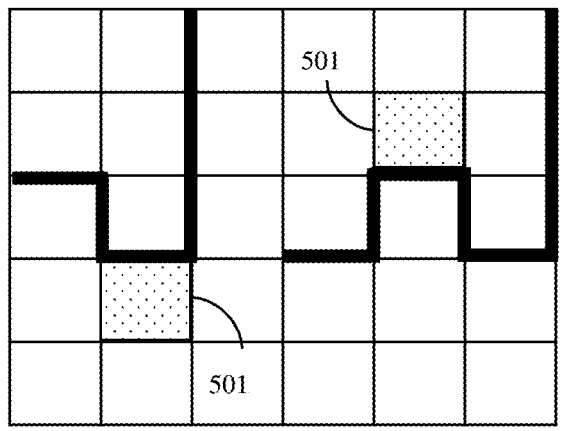
FIGS. 5A-5B are diagrams illustrating automatic Adjustment Type 1 where the length of a path can be increased without increasing the number of bends in the path.
Figure 5B:
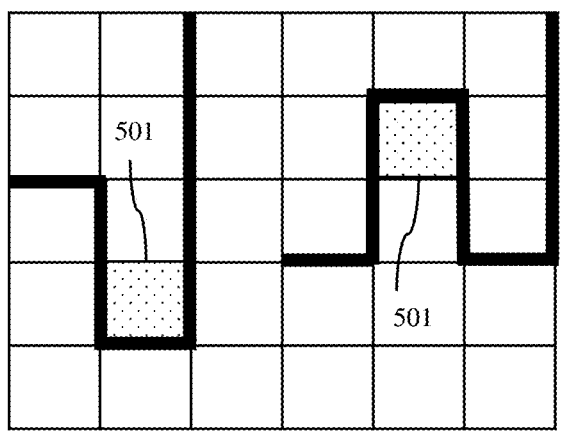
Figure 6A:
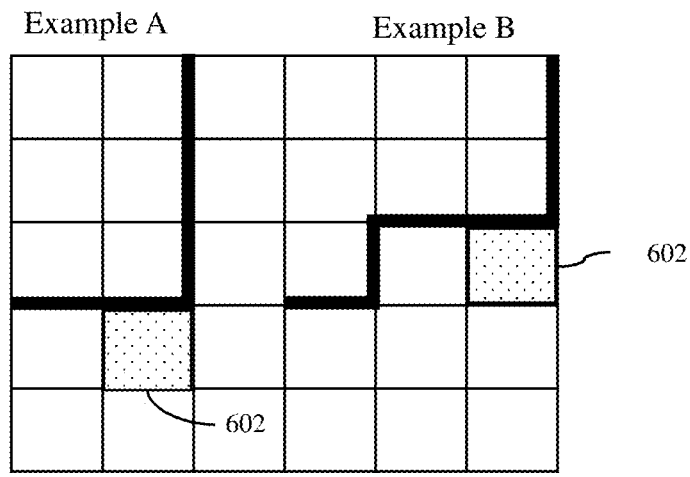
FIGS. 6A-6B are diagrams illustrating automatic Adjustment Type 2 where the length of a path is increased and the number of bends in the path is also increased.
Figure 6B:
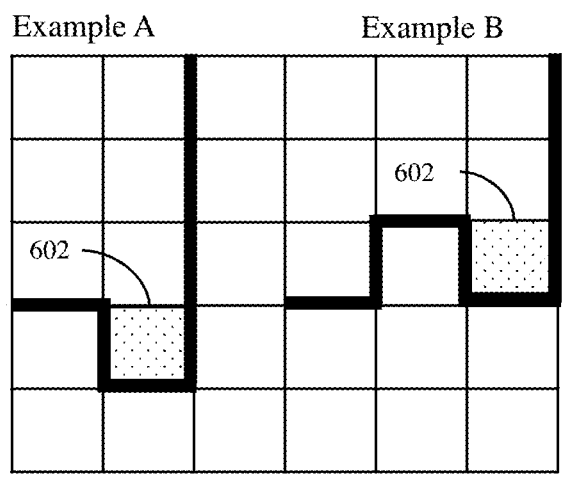

For example, when the difference between the length of a specific path $p_i$ and the longest path is greater than one (i.e., when $l_i>1$), then the processor 250 can reroute the specific path $p_i$ to increase its length in one of two ways: (a) Adjustment Type 1, where the length of the path is increased without increasing the number of bends within the path (if possible), as illustrated in FIGS. 5A-5B; or (b) Adjustment Type 2, where the length and the number of bends in the path are increased (if necessary), as illustrated in FIGS. 6A-6B. Specifically, when $l_i>1$, rules 1 and 3 are applied in order to identify a particular cell which can be employed to increase the length of a specific path $p_i$ (e.g., the shortest path) without increasing the number of bends in that specific path $p_i$. That is, a specific path $p_i$ can be scanned in an attempt to identify (i.e., find, locate, etc.) a particular cell (referred to herein as a first cell 501), which has at least one corner aligned with at least one bend in the specific path $p_i$ and that meets a set of first conditions. The set of first conditions can include: an intersection between a set of all grid points on the specific path and a set of all corners of the first cell 501 is equal to two; and an intersection between a set of all bends in the specific path waveguide $p_i$ and the set of all corners of the first cell 501 is also equal to two (i.e., $|A_i \cap S_i|=2 \wedge |B_i \cap S_i|=2$). If such a first cell 501 is identified (as shown in FIG. 5A), the processor 250 can drag (i.e., move, pull, etc.) the specific path $p_i$ around the first cell 501 effectively inserting two additional linear segments into the path to increase the total number of UL by two while maintaining the total number of bends constant (as shown in FIG. 5B). However, if no first cell 501 as described above is identified, increasing the length of the specific path $p_i$ (e.g., the shortest path) may still be possible. Specifically, the specific path $p_i$ can be scanned in an attempt to identify (i.e., find, locate, etc.) another particular cell (referred to herein as a second cell 602), which has at least one corner aligned with at least one bend in the specific path and that meets a set of second conditions. The set of second conditions can include: an intersection between the set of all grid points on the specific path and a set of all corners of the second cell is equal to two; and an intersection between the set of all bends in the specific path and a set of all corners of the second cell is equal to one (i.e., $|A_i \cap S_i|=2 \wedge |B_i \cap S_i|=1$). If such a second cell 602 is identified (as shown in FIG. 6A), the processor 250 can drag (i.e., move, pull, etc.) the specific path $p_i$ around the second cell 602 effectively inserting two additional linear segments and two additional bends into the path to increase the total number of UL by two and to also increase the total number of bends by two (as shown in FIG. 6B).

Figure 7A:
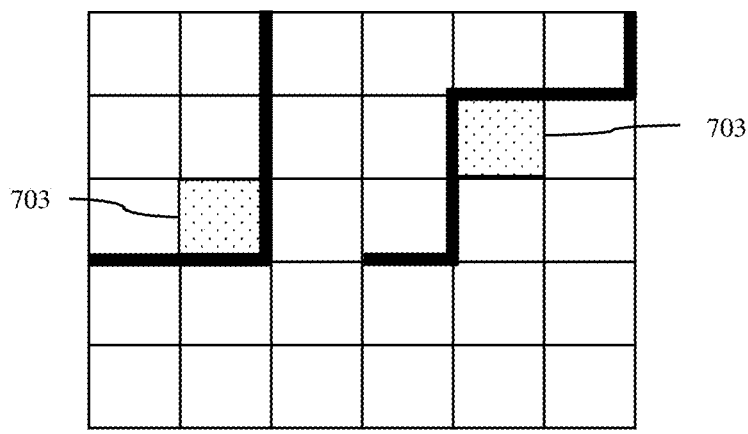
FIGS. 7A-7B are diagrams illustrating path automatic Adjustment Type 3 where the number of bends of a path can be increased without increasing the length of the path.
Figure 7B:
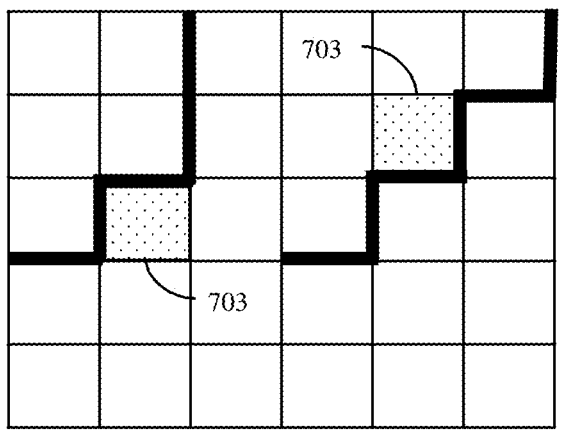

Furthermore, when a specific path $p_i$ has fewer bends than the bendiest path (i.e., when max(K)>$k_i$), then the processor 250 can reroute the paths to increase the number of bends in the specific path $p_i$ by using Adjustment Type 3, where the number of bends in the path is increased without increasing the length of the paths (if possible), as illustrated in FIGS. 7A-7B. Specifically, when max(K)>$k_i$, the processor 250 can scan the specific path $p_i$ in an attempt to identify (i.e., find, locate, etc.) a particular cell 703 (referred to herein as a third cell), which has at least one corner aligned with at least one bend in the specific path $p_i$ and that meets a set of third conditions. The set of third conditions can include: an intersection between a set of all grid points on the specific path and a set of all corners of the third cell is equal to three; and an intersection between a set of all bends in the specific path and the set of all corners of the third cell is equal to one (i.e., $|A_i \cap S_i|=3 \wedge |B_i \cap S_i|=1$). If such a third cell 703 is identified (as shown in FIG. 7A), the processor 250 can drag (i.e., move, pull, etc.) the specific path $p_i$ around the third cell 703 effectively inserting two additional bends into path to increase the total number of bends in the path by two while maintaining the total number of UL constant (as shown in FIG. 7B).

Figure 8A:
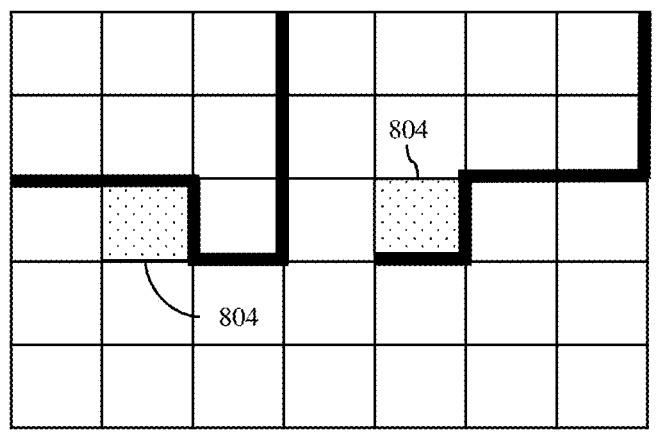
FIGS. 8A-8B are diagrams illustrating path automatic Adjustment Type 4 where linear segments of the path are moved without increasing the length of the path or the number of bends in the path.
Figure 8B:
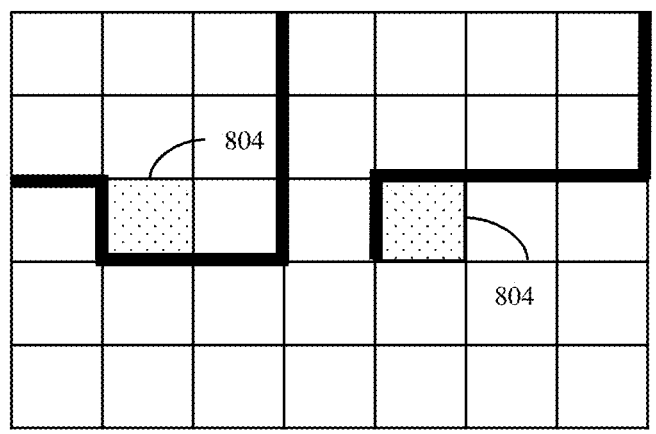

It should be noted that, when $l_i>1$ and/or max(K)>$k_i$, but there is insufficient room within the boundaries of the defined area to perform the necessary rerouting as described above (i.e., by dragging the specific path $p_i$ around an identified cell that meets a set of conditions in order to in increase the length and/or the number of bends within the specific path $p_i$) intermediate rerouting can be done by using Adjustment Type 4 in order to simply move a specific path $p_i$ without changing the total number of UL or the total number of bends and, thereby provide additional space within the rectangular-shaped area for further path route changes, as illustrated in FIGS. 8A-8B. For example, the processor 250 can scan a specific path $p_i$ in an attempt to identify (i.e., find, locate, etc.) yet another particular cell 804 (referred to herein as a fourth cell), which has at least one corner aligned with at least one bend in the specific path and that meets a set of fourth conditions. The set of fourth conditions can include: an intersection between the set of all grid points on the specific path and a set of all corners of the fourth cell is equal to three and an intersection between the set of all bends in the specific path; and a set of all corners of the fourth cell 804 is equal to two (i.e., $|A_i \cap S_i|=3 \wedge |B_i \cap S_i|=2$). If such a fourth cell 804 is identified (as shown in FIG. 8A), the processor 250 can drag (i.e., move, pull, etc.) the specific path $p_i$ around the fourth cell 804, thereby moving portions of the specific path $p_i$ while maintaining both the total number of units of length and the total number of bends constant (as shown in FIG. 8B).

Figure 9A:
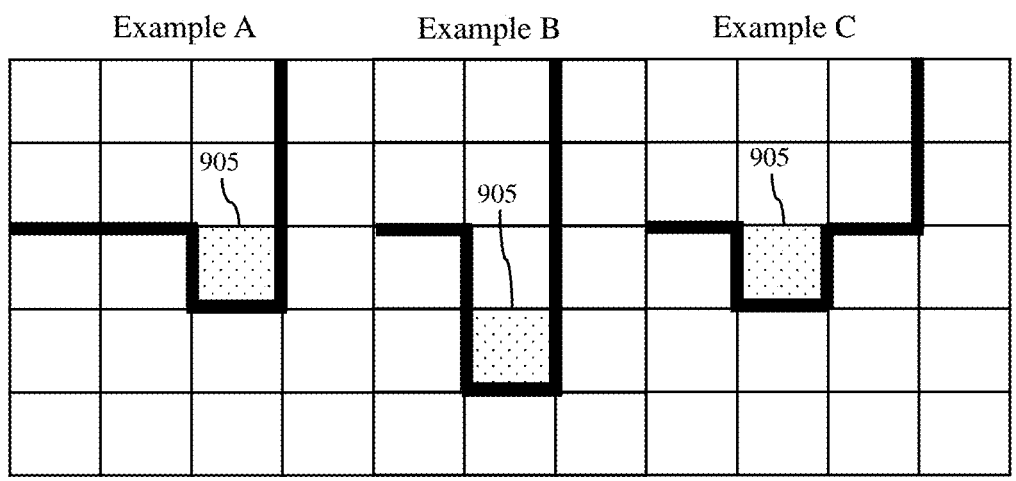
FIGS. 9A-9B are diagrams illustrating path automatic Adjustment Type 5 where the length and number of bends of a path are both reduced.
Figure 9B:
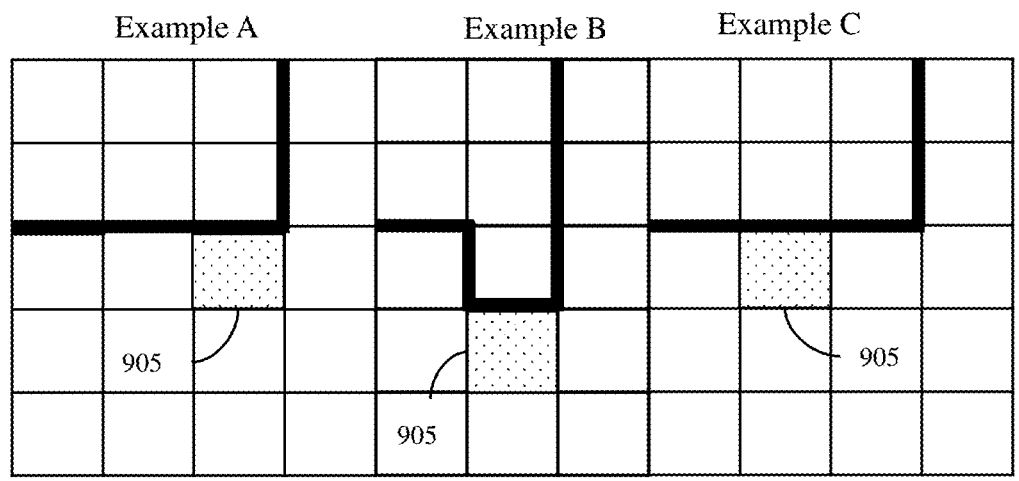

Optionally, the processor 250 could also automatically reroute the paths p1-p4 in order to reduce any differences in total length and total number of bends between the paths by using Adjustment Type 5 to remove portions of a specific path $p_i$ (e.g., the longest path), as illustrated in FIGS. 9A-9B. For example, processor 250 can scan the specific path $p_i$ to locate yet another particular cell 905 (referred to herein as a fifth cell), which has at least one corner aligned with at least one bend in the specific path $p_i$ and that meets fifth conditions comprising: an intersection between the set of all grid points on the specific path $p_i$ and a set of all corners of the fifth cell 905 equals four and an intersection between the set of all bends in the specific path $p_i$ and the set of all corners of the fifth cell 905 equals two, three or four (i.e., $|A_i \cap S_i|=4 \wedge |B_i \cap S_i|=2$, 3 or 4). If such a fifth cell 905 is found (as shown in FIG. 9A), the processor 250 can drag the specific path $p_i$ away from the fifth cell 905 so that it is pulled to one side of the cell instead of being wrapped around three sides, thereby reducing the length by two and, depending upon the value of $|B_i \cap S_i|$, decreasing or maintaining the total number of bends (as shown in FIG. 9B). Specifically, if $|A_i \cap S_i|=4 \wedge |B_i \cap S_i|=3$ (see Example A), then the length of the specific path $p_i$ is decreased by two and the total number of bends is decreased by two. If $|A_i \cap S_i|=4 \wedge |B_i \cap S_i|=2$ (see Example B), then the length of the specific path $p_i$ is increased by two and the total number of bends is maintained. If $|A_i \cap S_i|=4 \wedge |B_i \cap S_i|=4$ (see Example C), then the length of the specific path $p_i$ is increased by two and the total number of bends is reduced by four.

The above-mentioned path adjustment operations can be applied during iterative processing to determine when and where to automatically insert the additional linear segments and/or the additional bends (or if applicable remove linear segments and/or additional bends).

For example, in exemplary embodiments, when the paths p1-p4 have different lengths and/or different numbers of bends, the processor 250 can evaluate the paths p1-p4 and adjust the paths to balance the lengths and/or the numbers of bends as follows. The processor 250 can apply Adjustment Type 1 to increase the length(s) of the shorter path(s) without increasing the number(s) of bends in the shorter path(s), if possible. Adjustment Type 1 can be performed until the second longest path is balanced for length or no further adjustments can be made due to lack of space. If application of Adjustment Type 1 is not initially possible, the processor 250 can apply Adjustment Type 2 to increase the length(s) of the shorter path(s) and also the number(s) of bends in the shorter path(s). The processor 250 can then apply Adjustment Type 1 until the second longest path is balanced for length or no further adjustments for length can be made due to lack of space. Once the second longest path is balanced for length or no further adjustments can be made due to lack of space, the processor 250 can apply Adjustment Type 3 to add bends to those paths with fewer bends than the bendiest path until all paths have the same number of bends or no further adjustments can be made due to lack of space. The processor 250 can further determine whether additional space is currently required for making adjustments and, if so, can apply Adjustment Type 4 to reform one or more paths without increasing the length(s) of the path(s) or the number(s) of bends in the path(s). The processor 250 can then iteratively repeat these steps until all paths are balanced for length and number of bends.

FIGS. 10A-10E further illustrate this exemplary iterative processing for automatic rerouting of the paths p1-p4.

Figure 10A:
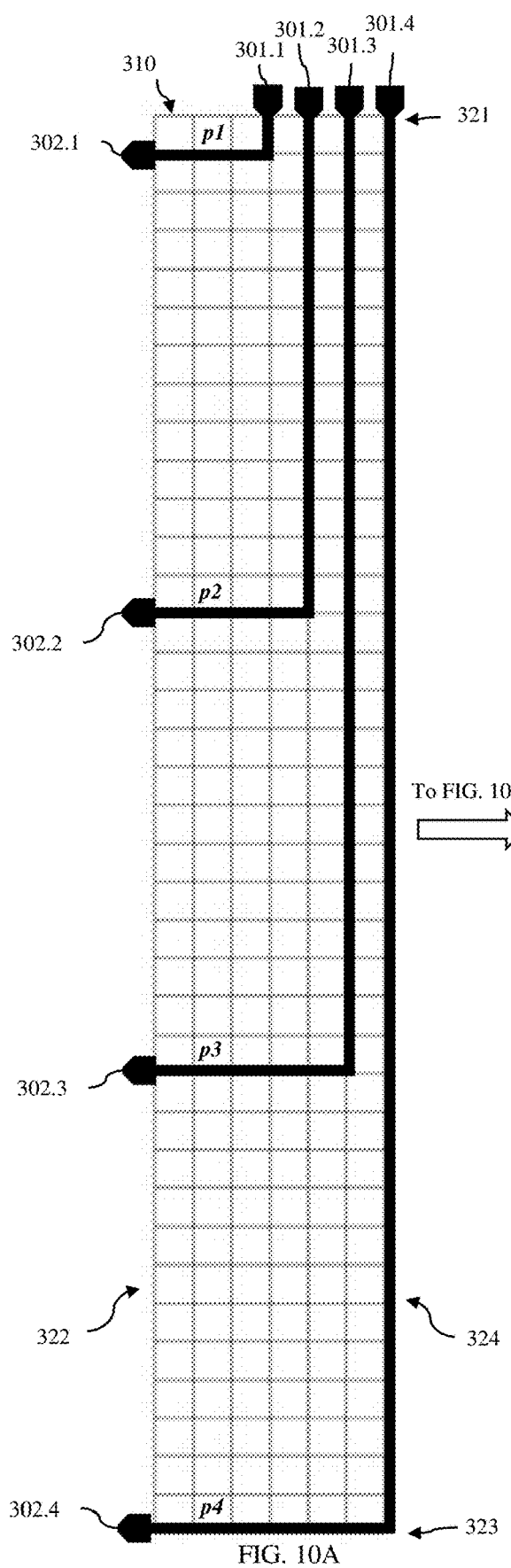
Figure 10B:
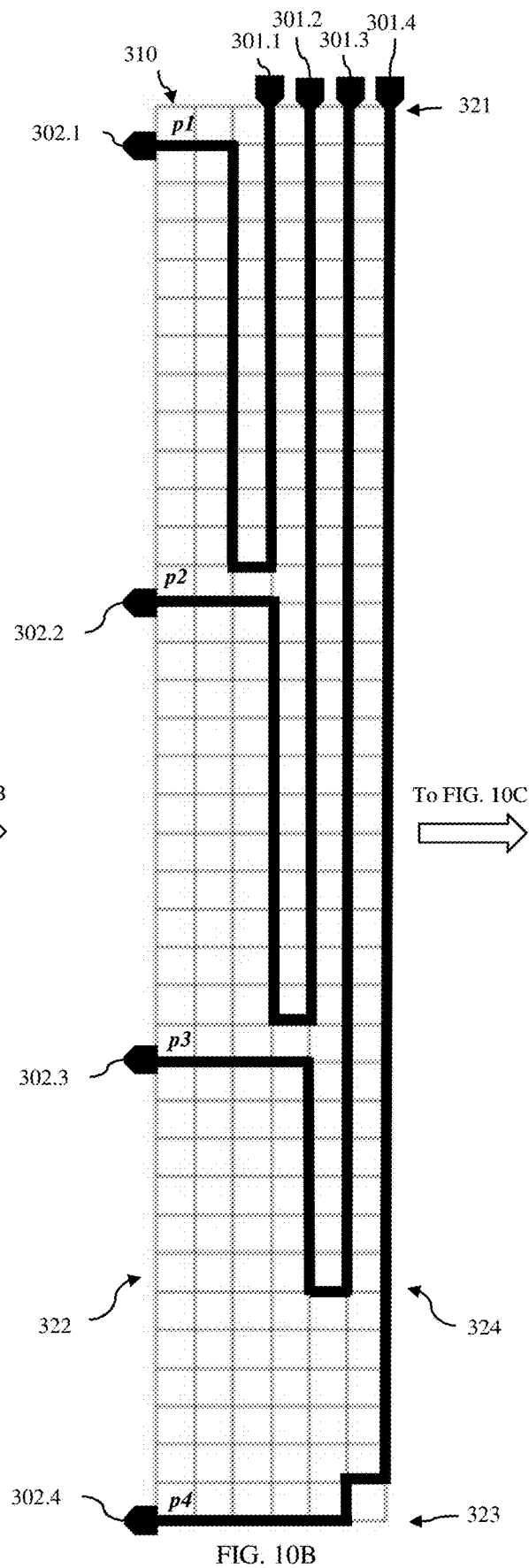

Specifically, starting with FIG. 10A, the processor 250 can determine that the paths p1-p4 all have different lengths and thus, can initiate the iterative processing for automatic rerouting to balance the paths. Since Adjustment Type 1 is not initially possible, the processor 250 can apply Adjustment Type 2 to increase the lengths of the shorter paths (i.e., p1-p3) by two UL and to also increase the numbers of bends in those paths by two. The processor 250 can then repeatedly apply Adjustment Type 1 to the shorter paths (i.e., p1-p3) to increase the lengths of those paths without further increasing the numbers of bends until the second longest path (i.e., p3) is balanced for length (i.e., has the same length as the longest path p4). The processor 250 can then apply Adjustment Type 3 to add bends to path p4, which is the only path with a smaller number of bends than the other paths (see FIG. 10B).

In the next iteration, the processor 250 can determine that there are still paths with different lengths and, particularly, that paths p1-p2 are still shorter than the longest paths (now p3 and p4) and repeat the above process steps. Specifically, starting with FIG. 10B and going to FIG. 10C, the processor 250 can apply Adjustment Types 1 and 2, as necessary, increasing the lengths of paths p1 and p2 as well as the numbers of bends in paths p1 and p2. The processor 250 can then apply Adjustment Type 3 to add bends to paths p3 and p4 without increasing the lengths of paths p3 and p4 so that all paths have the same number of bends (see FIG. 10C).

In the next iteration, the processor 250 can determine that there are still paths with different lengths and, particularly, that path p1 is still shorter than the longest paths (now p2-p4) and repeat the above process steps. Specifically, starting with FIG. 10C and going to FIG. 10D, the processor 250 can apply Adjustment Types 1 and 2, as necessary, increasing the length of path p1 as well as the number of bends in path p1. The processor 250 can further determine that paths p2-p4 all have fewer bends, but that not enough space is available for adding bends to paths p3 or p4. Thus, the processor 250 can apply Adjustment Type 3 to add bends to path p2 and can apply Adjustment Type 4 to reform paths p3 and p4 (see FIG. 10D).

Figure 10E:
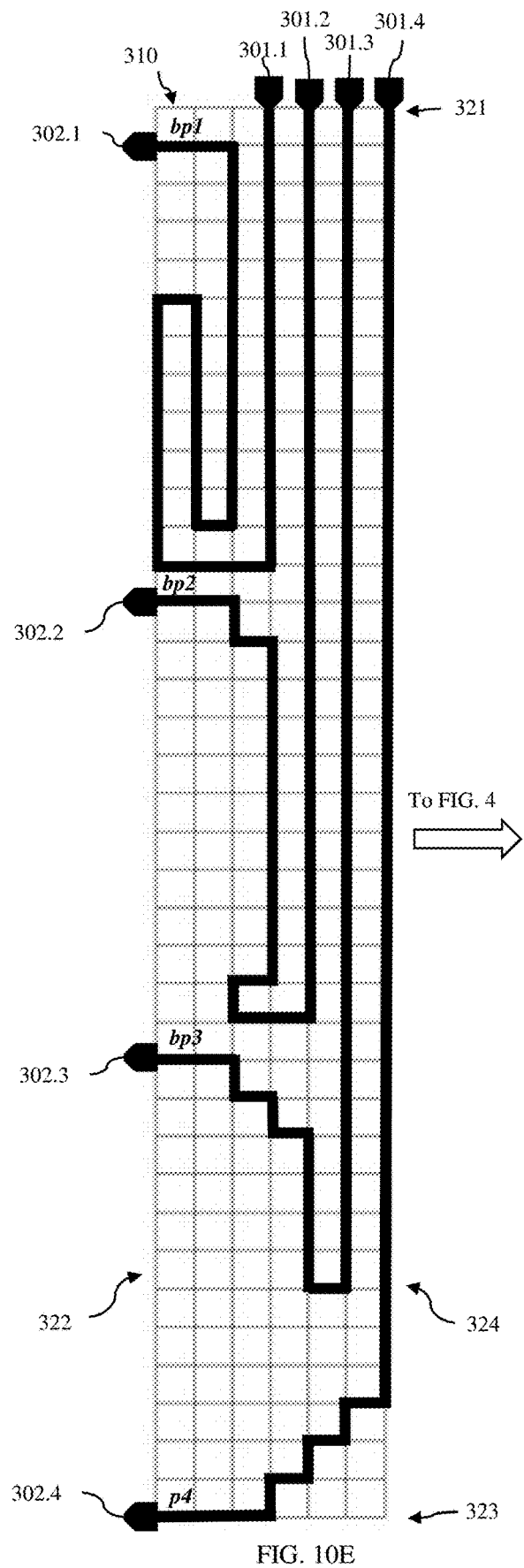

In the next iteration, the processor 250 can determine that there are still paths with different lengths and, particularly, that path p1 is still shorter than the longest paths (now p2-p4) and repeat the above process steps. Specifically, starting with FIG. 10D and going to FIG. 10E, the processor 250 can apply Adjustment Type 1 to further increase the length of path p1 without increasing the number of bends within path p1. The processor 250 can also determine that paths p3 and p4 still have fewer bends and can apply Adjustment Type 3 to add bends to paths p3 and p4 without increasing their respective lengths (see FIG. 10E). Thus, the paths shown in FIG. 10E are balanced for both length and number of bends (i.e., are balanced paths bp1-bp4).

It should be understood that the rerouting is performed such that the paths do not cross each other and such that critical distance design rules are not violated (e.g., such that paths remain separated by at least a minimum separation distance).

Figure 11:
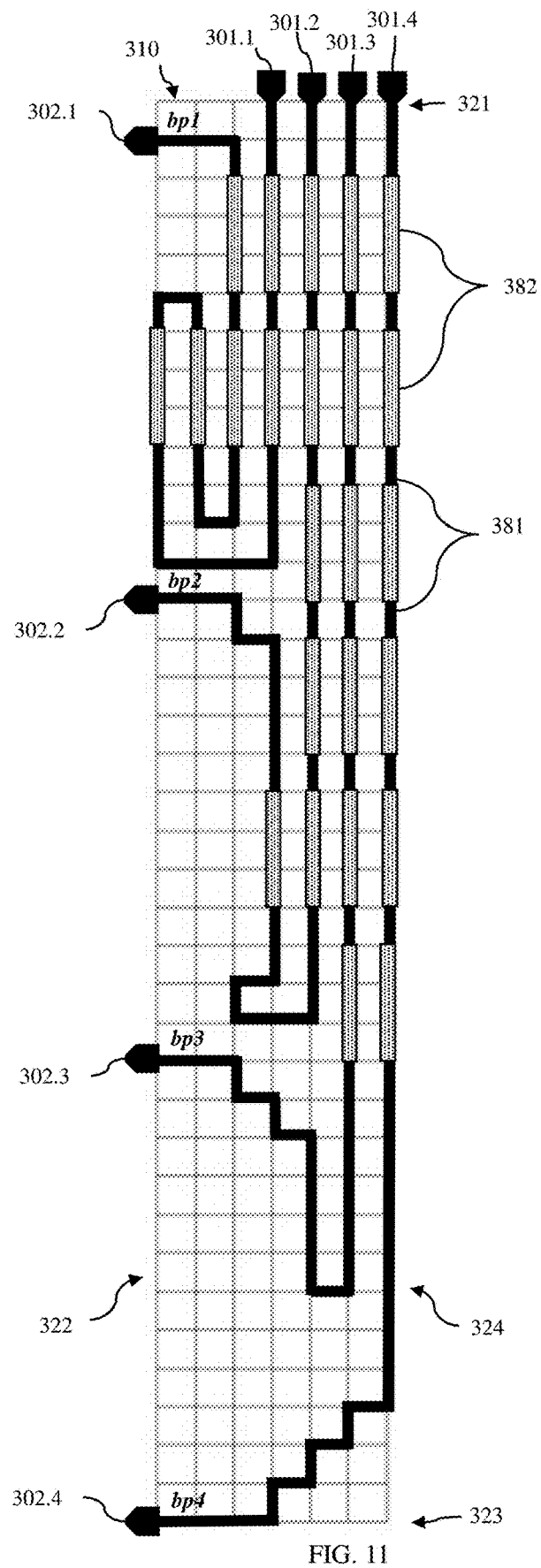
FIG. 11 is a diagram illustrating similar results for path rerouting of heterogeneous optical WGs.

It should also be noted that the optical WGs in the design for the WG bus can be homogeneous WGs. That is, they can each be made entirely of the same material (i.e., at the same mask level). For example, they can be silicon WGs, silicon nitride WGs, or WGs of any other suitable optical WG material. Alternatively, the optical WGs in the design for the WG bus can be heterogeneous WGs. That is, the design can indicate that the WGs should include different portions made with different WG materials (i.e., made at different mask levels). For example, each WG can include both silicon portions and silicon nitride portions. In this case, processor 250 can also balance the paths for the lengths and the numbers of bends in the different portions. Specifically, the processor 250 can initially perform balancing for total length and total number of bends in the paths (as discussed above and illustrated in FIGS. 10A-10E). Then, for the different portions with the different materials (i.e., a primary or first material 381 and a second material 382), the processor 250 can, for example, proceed by: initially associating the balanced paths bp1-bp4 with the primary material 381; determining the different lengths for the different portions (i.e., a first length for the portion with the primary material and a second length for the portion with the second material); and replacing, in each path, the same number of equal length linear segments of the first material 381 with the second material 382 to achieve the first length of the first material 381 and the second length of the second material 382 in each path (as illustrated in FIG. 11). It should be understood that FIG. 11 and the discussion thereof are not intended to be limiting. Similar balancing could be performed with respect to a WG bus have heterogenous optical WGs with different portions made with more than two different materials.

In any case, one balanced paths bp1-bp4 have been achieved, the processor 250 can generate the revised layout 300R (as illustrated in FIG. 4). Generation of the revised layout 300R includes unsnapping the bends in each of the paths from the corners of the grid cells 311 so that the bends have the same arc angle (θ) (e.g., of 90 degrees), the same fixed BR, and the same fixed arc length (S). That is, processor 250 can reshape all ninety degree turns within all of the balanced paths bp1-bp4 to form curved bends all with the same arc angle (θ) (e.g., of 90 degrees), the same fixed BR, and the same fixed arc length (S). Since the side length of each grid cell 311 is twice the fixed BR, unsnapping the bends in this manner will reduce the lengths of the paths bp1-bp4 but all paths will be reduced in length by the exact same amount because each path bp1-bp4 has the same number of bends. Thus, any differences in length across the paths will remain within the set threshold length difference (e.g., within 1 UL, within 2 UL, etc.).

It should be noted that, while the disclosed technique is described above with reference to a defined rectangular-shaped area where the first and second input/output nodes are placed on the top side and left side boundaries, all other cases where input/output nodes are placed on different adjacent side boundaries (e.g., bottom side and right side boundaries, etc.) can be viewed as rotations or cascaded composites of this base case.

Consequently, when a WG bus is manufactured according a layout (e.g., revised layout 300R), which has been automatically generated, as described above, by the disclosed system 200, any optical signals passing through the different optical WGs will be subjected to essentially equal amounts transmission loss and phase-shifting. Furthermore, the amounts of transmission loss and phase-shifting will be minimized because the solution set forth in the layout will be optimal with the balanced paths bp1-bp4 relatively short with few bends.

Figure 12:
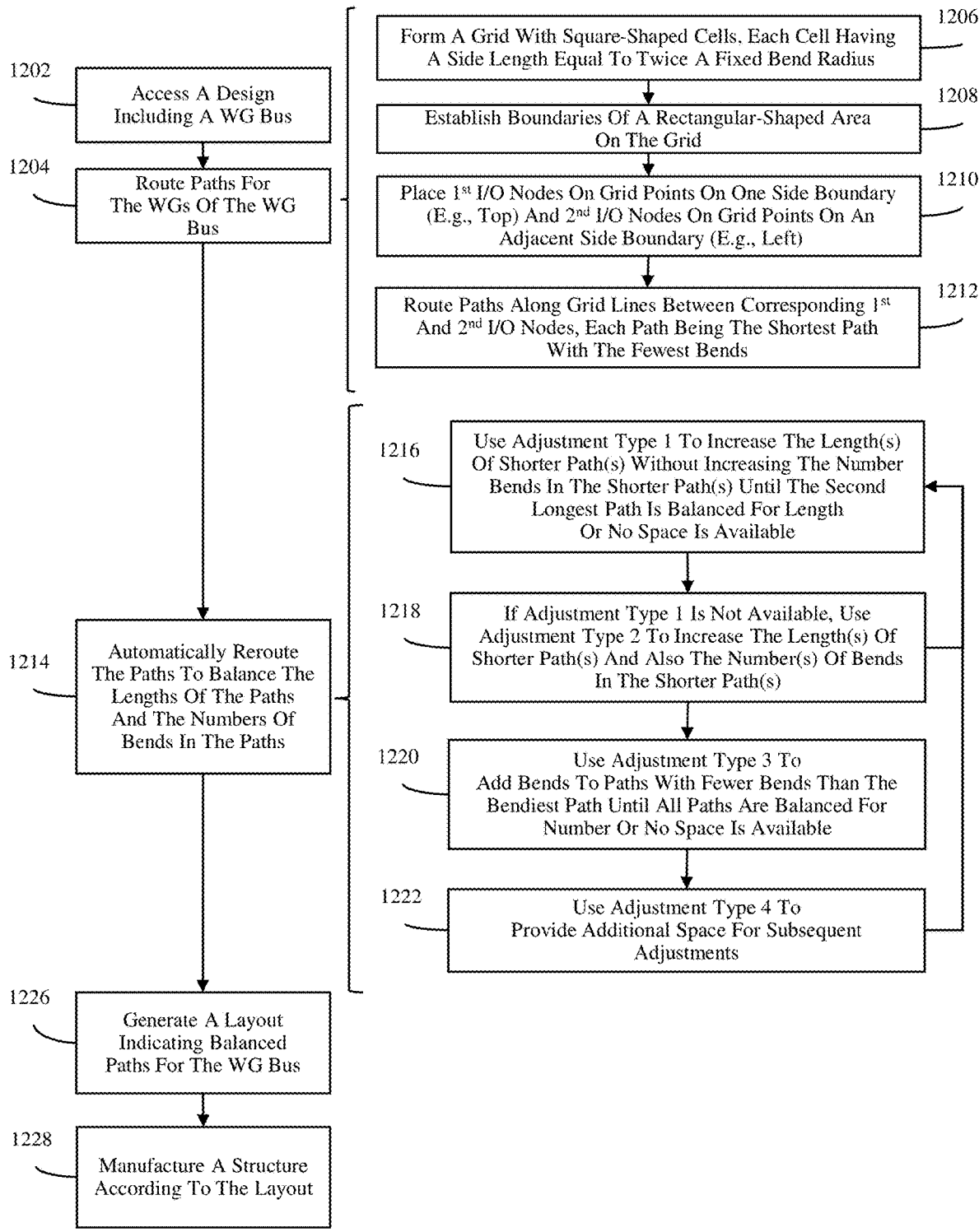
FIG. 12 is a flow diagram illustrating disclosed method embodiments for automatically generating a layout indicating paths for balanced optical WGs of a WG bus.

Referring to the flow diagram of FIG. 12, also disclosed herein are embodiments of a design method for automatically generating a layout for a waveguide (WG) bus that has paths balanced for essentially equal and minimal transmission loss and phase shifting.

Specifically, the method can include accessing, by a processor 250 from a storage medium 210, a preliminary design 220 (e.g., a schematic or elementary diagram) for a silicon photonics integrated circuit (PIC) or portion thereof that includes at least one waveguide (WG) bus with multiple optical WGs that, by design, should be balanced (see process step 1202). The method can further include routing paths for the optical WGs for the WG bus (see process step 1204 and exemplary paths p1-p4 shown in FIG. 3), automatically rerouting the paths to balance the lengths of the paths and the numbers of bends in the paths (see process step 1214), and generating a layout indicating balanced paths for the optical WGs of the WG bus (e.g., see the exemplary revised layout 300R of FIG. 4 with balanced paths bp1-bp4). For purposes of illustration, four paths for four optical WGs are shown in the figures; however, it should be understood that, depending upon the PIC design 220, there could be any number of two or more paths for any number of two or more optical WGs in the WG bus.

More specifically, process step 1204 can include forming a grid 310 (e.g., a cartesian grid) of cells 311, which are arranged in columns and rows (see process step 1206). The cells 311 can be square-shaped and identical in size. The side length of each cell can correspond to one unit of length (UL) for purposes measuring the total lengths of the paths and this one UL should be equal to two times the fixed bend radius (BR) (as discussed above with regard to the system embodiments). The outer lines of the grid 310 can define the side boundaries of a rectangular-shaped area within which the paths p1-p4 are to be routed (e.g., see the top side boundary 321, the left side boundary 322, the bottom side boundary 323 and the right side boundary 324) (see process step 1208). Finally, the numbers of columns and rows within the grid 310 can define the size (i.e., width and length, respectively, as measured in UL) of this rectangular-shaped area.

Process step 1204 can further include placing first and second input/output nodes for each of the optical WGs, respectively, on the grid 310 (see process step 1210). First and second input/output node placement can be performed at process step 1210 so that the first input/output nodes 301.1-301.4 for the optical WGs (and thereby for paths p1-p4, respectively) are placed at different grid points on one side boundary of the rectangular-shaped area (e.g., the top side boundary 321) and such that the second input/output nodes 302.1-302.4 for the optical WGs (and thereby for paths p1-p4, respectively) are placed at different grid points of an adjacent side boundary of the rectangular-shaped area (e.g., the left side boundary 322), which is perpendicular to the side boundary having the first input/output nodes 301.1-301.4.

Process step 1204 can further include routing paths p1-p4 for the optical WGs along the grid 310 so that each path extends between corresponding first and second input/output nodes, respectively (see process step 1212). These paths p1-p4 can be routed so that they are aligned with and extend along the vertical and horizontal lines of the grid 310 with each path typically following the shortest route with the smallest number of ninety degree turns between its first and second input/output nodes. It should be understood that the routing is performed at step 1204 such that the paths do not cross each other and such that critical distance design rules are not violated (e.g., such that paths remain separated by at least a minimum separation distance). It should also be noted that, during routing at process step 1204, each ninety degree turn of a path on the grid 310 corresponds to one bend in an optical WG. That is, while, as indicated above, the actual bends in the optical WG will have an arc angle of (θ), a same fixed bend radius (BR) and a same fixed arc length (S), in order to reduce complexity during routing these bends are snapped to the cell corners.

Following process step 1204, the paths p1-p4 can be automatically rerouted in order to reduce any differences in total length and in total number of bends between the paths (see process step 1214). For purpose of this disclosure, "balanced paths" refer to paths where the lengths of the paths are all within a preset threshold length difference (e.g., a length difference of less than 1 UL (ideally), a length difference of less than 2 UL, a length difference of less than 3 UL, etc.) and where the numbers of bends in the paths are all equal (i.e., the difference in the number of bends is 0). This process step 1214 of automatically rerouting the paths can include inserting additional linear segments, which are each equal to one UL, and/or additional bends, into at least one of the paths without moving first and second input/output nodes and without falling outside the defined boundaries. Inserting the additional linear segments and/or the additional bends into the path(s) results in the creation of balanced paths.

The technique and, particularly, the algorithm used at process 1214 to determine when and where to automatically insert the additional linear segments and/or the additional bends employs specific adjustment operations (e.g., see Adjustment Types 1-5 illustrated in FIGS. 5A-5B to FIGS. 9A-9B, respectively). As discussed in greater detail above with regard to the CAD system 200, these adjustment operations are based specific rules (e.g., Rules 1-3) applicable to certain data sets (e.g., P, $A_i$, $S_i$, K) and specific integers (e.g., |P|, $l_i$, $p_i$, and $k_i$). The technique further iteratively applies these adjustment operations.

For example, when the paths p1-p4 have different lengths and/or different numbers of bends, the paths p1-p4 can be evaluated and the lengths of and/or numbers of bends in the paths can be adjusted as follows. Adjustment Type 1 can be applied to increase the length(s) of the shorter path(s) without increasing the number of bends in the shorter path(s), if possible (see process step 1216). Adjustment Type 1 can be performed until the second longest path is balanced for length or no further adjustments can be made due to lack of space. If application of Adjustment Type 1 is not initially possible, Adjustment Type 2 can be applied to increase the length(s) of the shorter path(s) and also the number(s) of bends in the shorter path(s) (see process step 1218). Then, Adjustment Type 1 can be applied until the second longest path is balanced for length or no further adjustments for length can be made due to lack of space (see process step 1216). Once the second longest path is balanced for length or no further adjustments can be made due to lack of space, Adjustment Type 3 can be applied to add bends to those paths with fewer bends than the bendiest path until all paths have the same number of bends or no further adjustments can be made due to lack of space (see process step 1220). A determination can be made as to whether additional space is currently required for making adjustments and, if so, Adjustment Type 4 can be applied to reform one or more paths without increasing the length(s) of the path(s) or the number(s) of bends in the path(s) (see process step 1222). The processes 1216-1222 can then be iteratively repeated until all paths are balanced for length and number of bends. That is, until balanced paths bp1-bp4 extend between the same corresponding pairs of first and second input/output nodes 301.1/302.1, 301.2/302.2, 301.3/302.3 301.4-302.4 as did the paths p1-p4, are within the same defined boundaries 321-324 of the grid 310 and have minimal differences, if any, in length and the same number of bends.

See also FIGS. 10A-10E and the detailed discussion above further illustrating this iterative application of the adjustment operations.

It should be understood that the above-described rerouting is performed such that the paths do not cross each other and such that critical distance design rules are not violated (e.g., such that paths remain separated by at least a minimum separation distance).

It should also be noted that the optical WGs in the design for the WG bus can be homogeneous WGs. That is, they can each be made entirely of the same material (i.e., at the same mask level). For example, they can be silicon WGs, silicon nitride WGs, or WGs of any other suitable optical WG material. Alternatively, the optical WGs in the design for the WG bus can be heterogeneous WGs. That is, the design can indicate that the WGs should include different portions made with different WG materials (i.e., made at different mask levels). For example, each WG can include both silicon and silicon nitride portions. In this case, the paths can also be balanced for the lengths and the numbers of bends in the different portions. Specifically, balancing for total length and total number of bends in the paths can be performed (as discussed above and illustrated in FIGS. 10A-10E). Then, for the different portions with the different materials (i.e., a primary or first material 381 and a second material 382), the method can, for example, proceed by: initially associating the balanced paths bp1-bp4 with the primary material 381; determining the different lengths for the different portions (i.e., a first length for the portion with the primary material and a second length for the portion with the second material); and replacing, in each path, the same number of equal length linear segments of the first material 381 with the second material 382 to achieve the first length of the first material and the second length of the second material in each path (as illustrated in FIG. 11). It should be understood that FIG. 11 and the discussion thereof are not intended to be limiting. Similar balancing could be performed with respect to a WG bus have heterogenous optical WGs with different portions made with more than two different materials.

In any case, once balanced paths bp1-bp4 have been achieved (e.g., as shown in FIG. 10E), the revised layout 300R can be generated (see process step 1226 and FIG. 4). Generation of the revised layout 300R can include unsnapping the bends in each of the paths from the corners of the grid cells 311 so that the bends have the same arc angle (θ) (e.g., of 90 degrees), the same fixed BR, and the same fixed arc length (S). That is, all ninety degree turns within all of the balanced paths bp1-bp4 can be reshaped to form curved bends all with the same arc angle (θ) (e.g., of 90 degrees), the same fixed BR, and the same fixed arc length (S). Since the side length of each grid cell 311 is twice the fixed BR, unsnapping the bends in this manner will reduce the lengths of the paths bp1-bp4 but all paths will be reduced in length by the exact same amount because each path bp1-bp4 has the same number of bends. Thus, any differences in length across the paths will remain within the set threshold length difference (e.g., within 1 UL, within 2 UL, etc.).

It should be noted that, while the disclosed technique is described above with reference to a defined rectangular-shaped area where the first and second input/output nodes are placed on the top side and left side boundaries, all other cases where input/output nodes are placed on different adjacent side boundaries (e.g., bottom side and right side boundaries, etc.) can be viewed as rotations or cascaded composites of this base case.

The method can further include manufacturing a WG bus according to the automatically generated revised layout 300R (see process step 1228). As a result of being formed according to this layout 300R, during WG bus operation, any optical signals passing through the different optical WGs will be subjected to essentially equal amounts transmission loss and phase-shifting. Furthermore, the amounts of transmission loss and phase-shifting will be minimized because the solution set forth in the layout will be optimal with the balanced paths bp1-bp4 relatively short with few bends.

Figure 13A:
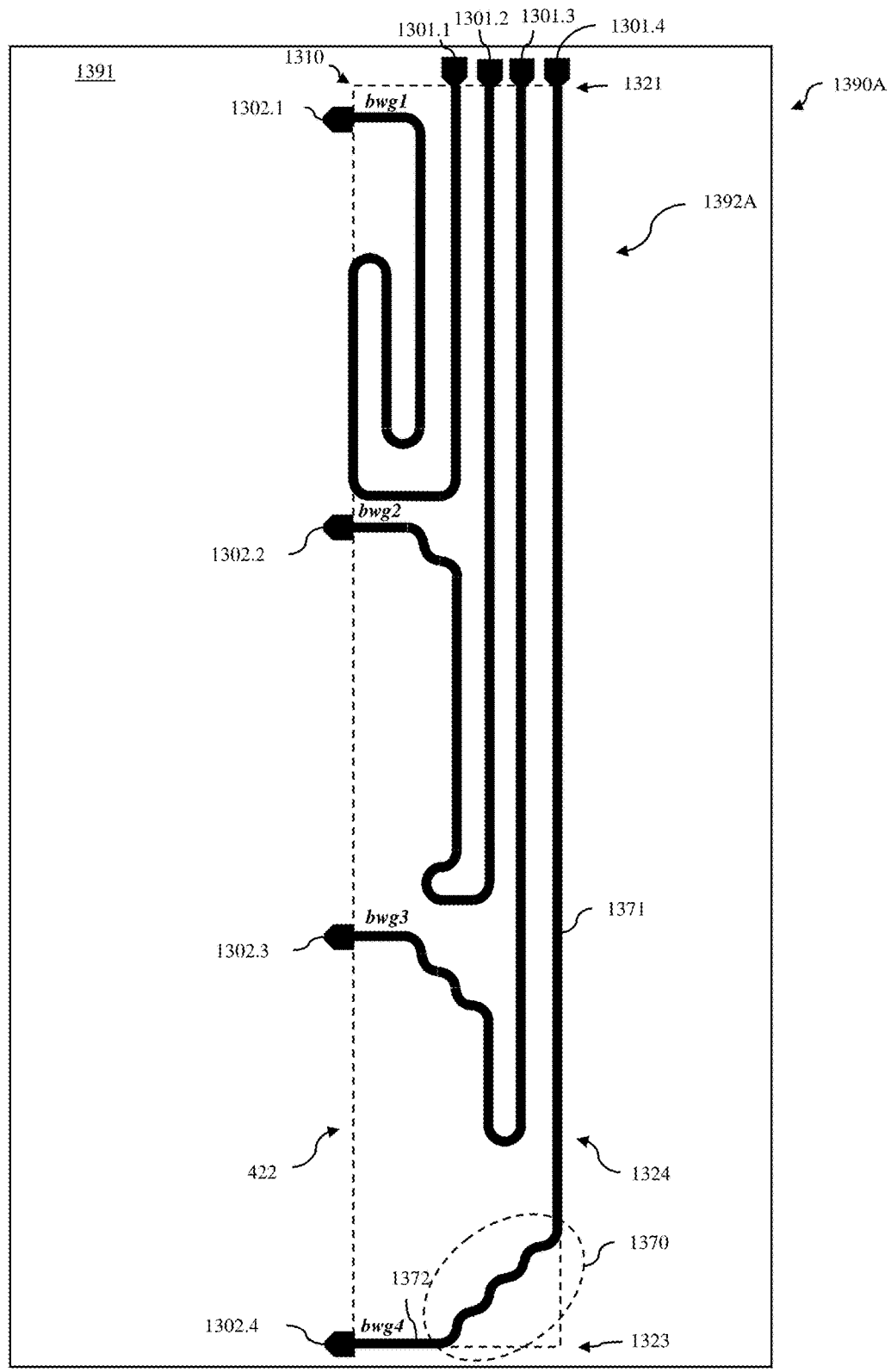
FIGS. 13A and 13B illustrating exemplary embodiments of a structure (e.g., a silicon photonic integrated circuit (PIC) chip) formed using the disclosed system and method.
Figure 13B:
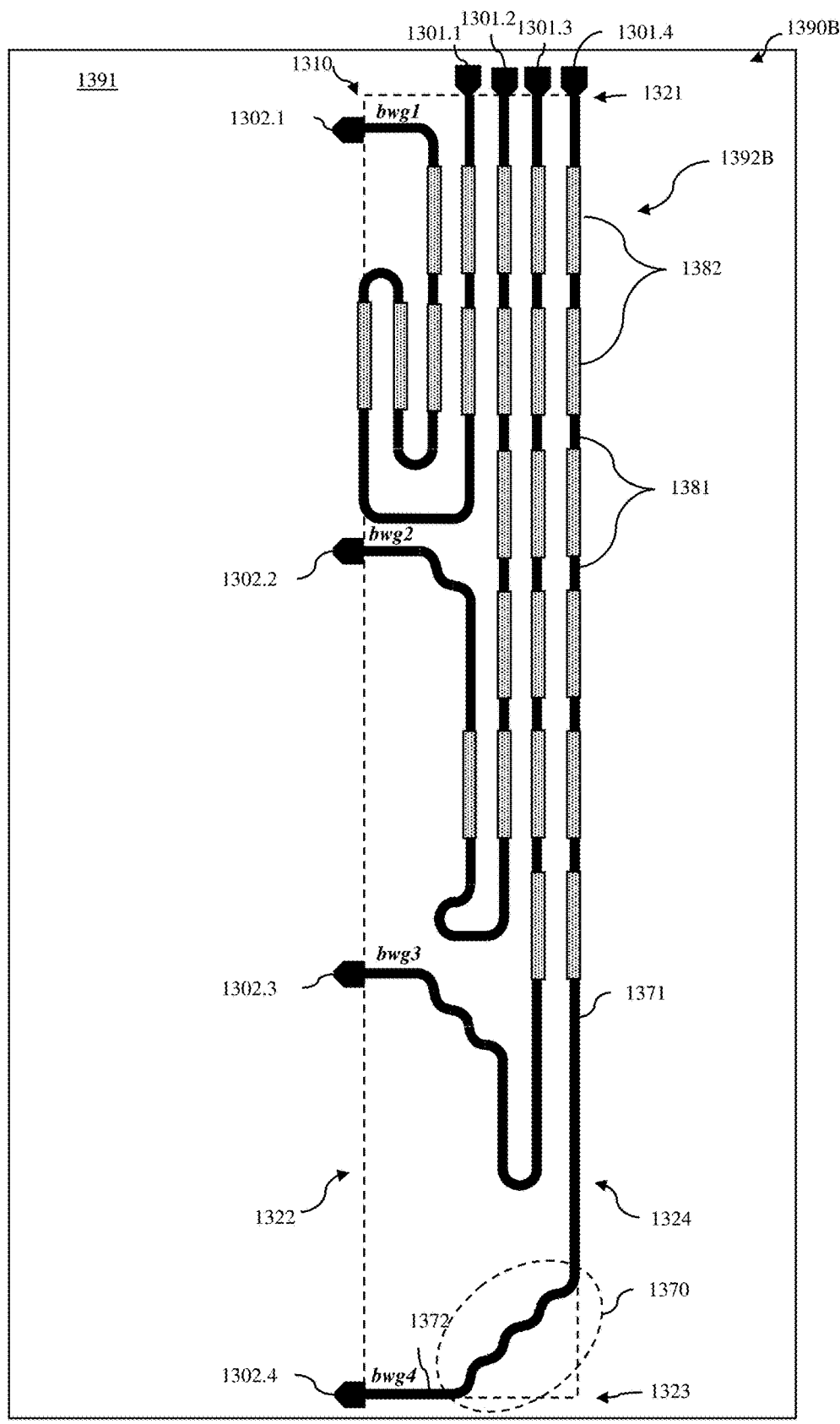

Referring to FIGS. 13A and 13B, also disclosed herein are embodiments of a structure 1390A, 1390B (e.g., a silicon photonic integrated circuit (PIC) chip). The structure 1390A, 1390B can include a substrate 1391 and, on the substrate 1391, a waveguide (WG) bus 1392A, 1392B with multiple optical WGs (e.g., see optical WGs bwg1-bwg4). For purposes of illustration, four optical WGs are shown FIGS. 13A and 13B; however, it should be understood that, alternatively, there could be any number of two or more WGs in WG bus. The optical WGs bwg1-bwg4 can, for example, be WGs that were manufactured according to a specific layout, which was automatically generated by any of the above-described system, method or computer program product embodiment, such that they are balanced for length and number of bends, as discussed below.

Specifically, the WG bus 1392A, 1392B can be within a rectangular-shaped area 1310 with defined boundaries 1321-1324. First and second input/output nodes for each of the optical WGs, respectively, can be on adjacent side boundaries. That is, first input/output nodes 1301.1-1301.4 for the optical WGs bwg1-bwg4, respectively, can be on one side boundary (e.g., top side boundary 1321) and second input/output nodes 1302.1-1302.4 for the optical WGs bwg1-bwg4, respectively, can be on an adjacent side boundary (e.g., left side boundary 1322), which is perpendicular to the side boundary having the first input/output nodes 1301.1-1301.4. The pitch of the first input/output nodes 1301.1-1301.4 may be the same as or different from (e.g., less or greater than) the pitch of the second input/output nodes 1302.1-1302.4. The separation distances between each pair of first and second input/output nodes for each optical WG are different and are progressively larger for each optical WG. For example, as illustrated, the first and second input/output nodes 1301.1/1302.1 for the first optical WG bwg1 are separated by the shortest distance; the first and second input/output nodes 1301.2/1302.2 for the second optical WG bwg2 are separated by the next shortest separation distance; and so on with the first and second input/output nodes 1301.4/1302.4 for the fourth optical WG bwg4 being separated by the longest separation distance.

The optical WGs bwg1-bwg4 can extend between corresponding first and second input/output nodes, respectively. That is, the first optical WG bwg1 can extend between the first and second input/output nodes 1301.1/1302.1; the second optical WG bwg2 can extend between the first and second input/output nodes 1301.2/1302.2; the third optical WG bwg3 can extend between the first and second input/output nodes 1301.3/1302.3; and the fourth optical WG bwg4 can extend between the first and second input/output nodes 1301.4/1302.4. Additionally, each of these optical WGs bwg1-bwg4 can include different combinations of linear sections and bends so that they are balanced for length and number of bends. That is, so that the lengths of the paths bwg1-bwg4 are all within a preset threshold length difference (e.g., a length difference of less than 1 unit of length (UL) (ideally), a length difference of less than 2 UL, a length difference of less than 3 UL, etc.) and such that the numbers of bends in the paths are all equal (i.e., the difference in the number of bends is 0).

It should be understood that the optical WGs bwg1-bwg4 do not cross each other and that critical distance design rules are not violated (e.g., paths are separated by at least a minimum separation distance). Additionally, it should be noted that the bends in the optical WGs bwg1-bwg4 of the WG bus 1392A or 1392B can all have the same fixed arc angle ($\theta$) of 90 degrees, the same fixed BR, and the same fixed arc length (S). Furthermore, each unit of length (UL) discussed above can equal to twice the fixed BR.

In any case, because the WG bus 1390A, 1390B has been manufactured according to a layout automatically generated by any of the above-described system, method, or computer program product embodiments, at least one specific optical WG, which extends between first and second input/output nodes that are separated by the longest distance, can include a specific combination of linear sections and bends and this specific combination can include a cascade of bends with a stepped shape. This same optical WG can also include the longest single linear section of all linear sections of all the optical WGs bwg1-bwg4, which extends from its first input/output node to a first end of the cascade of bends along one side boundary of the rectangular-shaped area. In some embodiments, an additional linear segment can extend from its second input/output node along an adjacent side boundary to a second end of the cascade of bends. In other embodiments, the second end of the cascade of bends could be connected to the second input/output node.

For example, as illustrated in FIGS. 13A and 13B, the optical WG bwg4 extends between first and second input/output nodes 1301.4/1302.4, which are separated by the longest distance of all of the first and second input/output node pairs. The optical WG bwg4 includes a specific combination of linear sections and bends including a cascade of bends 1370 with a stepped shape. This same optical WG bwg4 includes, within the combination of linear sections and bends, two linear sections. The two linear sections include the longest single linear section 1371 of all linear sections of all the optical WGs bwg1-bwg4, which extends from the first input/output node 1301.4 of optical WG bwg4 along the right side boundary 1324 of the rectangular-shaped area 1310 to the first end of the cascade of bends 1370, and an additional linear section 1372, which is shorter than the linear section 1371 and which extends from the second input/output node 1302.4 of optical WG bwg4 along the bottom side boundary 1323 of the rectangular-shaped area 1310 to the second end of the cascade of bends 1310.

It should also be noted that the optical WGs bwg1-bwg4 of the WG bus 492A can be homogeneous WGs (see FIG. 13A and the structure 1390A). That is, they can each be made entirely of the same material (i.e., at the same mask level). For example, they can be silicon WGs, silicon nitride WGs, or WGs of any other suitable WG material. Alternatively, the optical WGs bwg1-bwg4 of the WG bus 1392B can be heterogeneous WGs (see FIG. 13B and the structure 1390B). That is, in the WG bus 1392B the optical WGs bwg1-bwg4 could include different portions made with different WG materials. For example, each optical WG bwg1-bwg4 can include both silicon portions and silicon nitride portions. In this case, optical WG bwg1-bwg4 are also balanced for the lengths and the numbers of bends in the different material portions. That is, the same material in each WG can have the same total length and same number of bends. For example, each optical WG bwg1-bwg4 can have primary or first material sections 1381 and a second material sections 1382. In each optical WG bwg1-bwg4, the primary first sections 1381 and second material sections 1382 in combination can follow the balanced paths set forth in the layout. Furthermore, each pair of first material sections 1381 can be connected by a second material section 1382, all second material sections 1382 can be linear only and can have the same length and all of the optical WGs bwg1-bwg4 can include the same number of the second material sections 1382. Thus, the total length of and total number of bends in the first material sections 1381 of each WG will be the same and, similarly, the total length of and total number of bends in the second material sections 1382 of each WG will be the same.

Also disclosed herein are embodiments of a computer program product. The computer program product can include a computer readable storage medium, which has, embodied therewith (e.g., stored thereon), at least a software tool with program instructions for waveguide (WG) layout generation. The program instructions for waveguide layout generation can be readable by a processor, which can execute the instructions in order to perform the above-describe method for automatically generating a layout indicating the paths for balanced optical waveguides (WGs) of a WG bus.

More specifically, as mentioned above, the present invention may be implemented as a system or a method. Additionally, aspects of the invention (e.g., the controller, described above) may be implemented in the form a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 14:
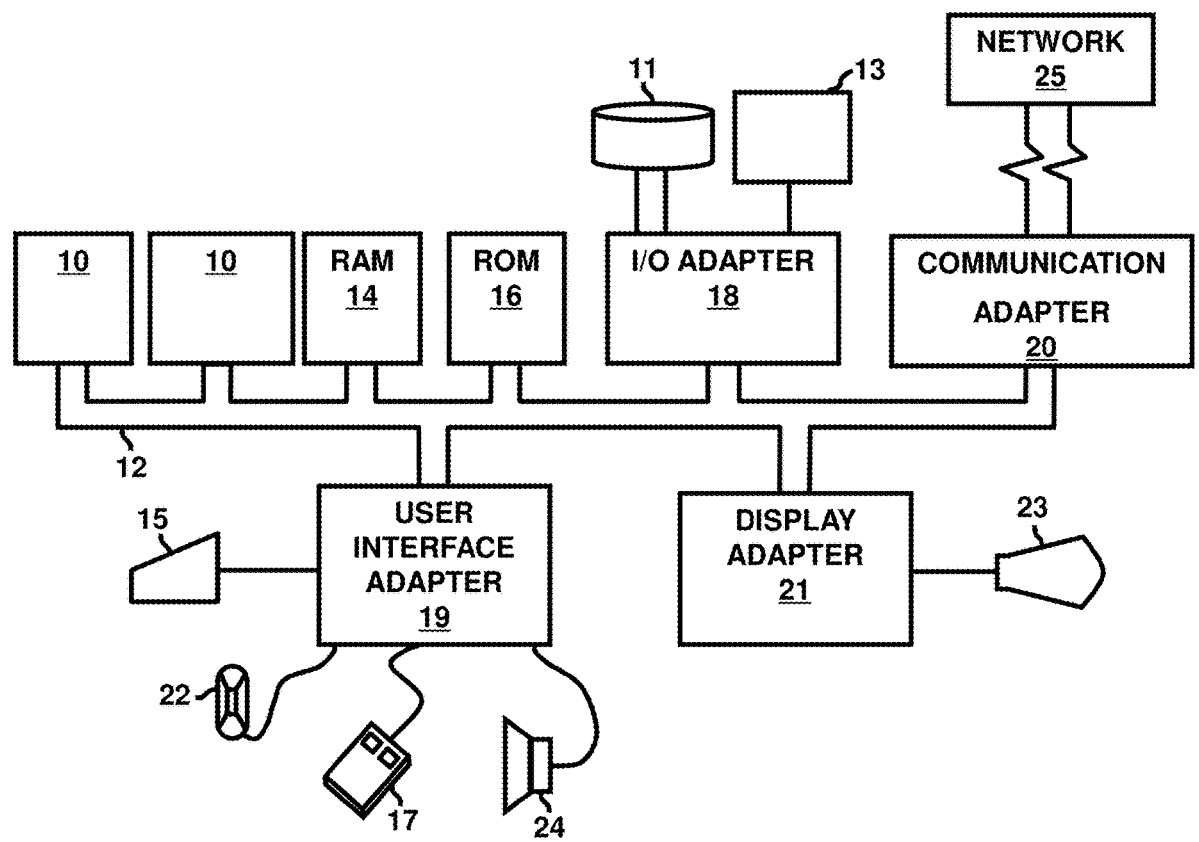
FIG. 14 is a schematic diagram illustrating an exemplary computer system which can be employed for implementing the disclosed system and method embodiments.

A representative hardware environment (i.e., a computer system) for implementing the disclosed system and method embodiments is depicted in FIG. 14. This schematic drawing illustrates a hardware configuration of an information handling/computer system in accordance with the embodiments herein. The system comprises at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "in direct contact", "abutting", "directly adjacent to", "immediately adjacent to", etc., are intended to indicate that at least one element physically contacts another element (without other elements separating the described elements). The term "laterally" is used herein to describe the relative locations of elements and, more particularly, to indicate that an element is positioned to the side of another element as opposed to above or below the other element, as those elements are oriented and illustrated in the drawings. For example, an element that is positioned laterally adjacent to another element will be beside the other element, an element that is positioned laterally immediately adjacent to another element will be directly beside the other element, and an element that laterally surrounds another element will be adjacent to and border the outer sidewalls of the other element. The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
routing, by a processor, paths for optical waveguides of a waveguide bus, wherein the paths are routed within boundaries of a rectangular-shaped area and extend between corresponding first and second input/output nodes, respectively;
automatically rerouting, by the processor, the paths to reduce differences in any of total length and total number of bends, wherein the automatically rerouting of the paths comprises inserting any of additional linear segments and additional bends into at least one of the paths to create balanced paths that extend between the corresponding first and second input/output nodes, respectively, and that are within the boundaries; and
generating, by the processor, a layout indicating the balanced paths for the optical waveguides.

2. The method of claim 1, wherein reducing the differences in the total length and the total number of bends balances transmission loss and phase shifting of optical signals transmitted through the optical waveguides.

3. The method of claim 1, wherein the routing of the paths comprises:
forming a grid of cells, wherein the cells are square-shaped and wherein each side of each cell corresponds to one unit of length and is twice as long as a fixed bend radius set for all bends in the optical waveguides;
establishing the boundaries of the rectangular-shaped area along lines on the grid;
placing the first and second input/output nodes for the optical waveguides on the grid such that all first input/output nodes are at grid points on one side boundary of the rectangular-shaped area and all second input/output nodes are at grid points on an adjacent side boundary of the rectangular-shaped area; and
routing the paths along lines of the grid such that each path between a first input/output node and a second input/output node represents a shortest route with a smallest number of ninety degree turns, wherein each ninety degree turn corresponds to one bend.

4. The method of claim 3, wherein the rerouting of the paths is performed iteratively and wherein, for any specific path under consideration, additional linear segment insertion and additional bend insertion are based on results of both an intersection operation between a set of all grid points on the specific path and a set of all corners of an identified cell that has at least one corner aligned with at least one bend in the specific path and an intersection operation between a set of all bends in the specific path and the set of all corners of the identified cell.

5. The method of claim 3,
wherein the rerouting of the paths comprises increasing a length of a specific path, and
wherein the increasing of the length of the specific path comprises any of:
scanning for a first cell that has at least one corner aligned with at least one bend in the specific path and that meets first conditions comprising: an intersection between a set of all grid points on the specific path and a set of all corners of the first cell equals two and an intersection between a set of all bends in the specific path and the set of all corners of the first cell equals two;
when the first cell is identified, dragging the specific path around the first cell effectively inserting two additional linear segments into the specific path to increase the total length by two units of length and maintain the total number of bends;
when no first cell is identified, scanning for a second cell that has at least one corner aligned with at least one bend in the specific path and that meets second conditions comprising: an intersection between the set of all grid points on the specific path and a set of all corners of the second cell equals two and an intersection between the set of all bends in the specific path and the set of all corners of the second cell equals one; and
when the second cell is identified, dragging the specific path around the second cell effectively inserting two additional linear segments and two additional bends into the specific path to effectively increase the total length by two units of length and the total number of bends by two.

6. The method of claim 3,
wherein the rerouting of the paths comprises increasing a number of bends in a specific path, and
wherein the increasing of the number of bends in the specific path comprises:
scanning for a third cell that has at least one corner aligned with at least one bend in the specific path and that meets third conditions comprising: an intersection between a set of all grid points on the specific path and a set of all corners of the third cell equals three and an intersection between a set of all bends in the specific path and the set of all corners of the third cell equals one; and
when the third cell is identified, dragging the specific path around the third cell effectively inserting two additional bends into the specific path to increase the total number of bends by two and maintain the total length.

7. The method of claim 3,
wherein the rerouting of the paths comprises moving a specific path to provide additional space for further path route changes, and wherein the moving of the specific path comprises:
scanning for a fourth cell that has at least one corner aligned with at least one bend in the specific path and that meets fourth conditions comprising: an intersection between the set of all grid points on the specific path and a set of all corners of the fourth cell equals three and an intersection between the set of all bends in the specific path and the set of all corners of the fourth cell equals two; and
when the fourth cell is identified, dragging the specific path around the fourth cell so as to move the specific path while maintaining both the total length and the total number of bends.

8. The method of claim 3, wherein the generating of the layout comprises reshaping all ninety degree turns within all of the balanced paths to form curved bends with the fixed bend radius.

9. A system comprising:
a storage medium storing a schematic diagram for a waveguide bus comprising multiple optical waveguides; and
a processor in communication with the storage medium,
wherein the processor accesses the schematic diagram and, based on the schematic diagram, routes paths for the optical waveguides within boundaries of a rectangular-shaped area,
wherein the paths extend between first and second input/output nodes, respectively, wherein the processor further automatically reroutes the paths to reduce differences in any of total length and total number of bends by inserting any of additional linear segments and additional bends into at least one of the paths to create balanced paths that extend between the corresponding first and second input/output nodes, respectively, and that are within the boundaries, and
wherein the processor further generates a layout indicating the balanced paths for the optical waveguides.

10. The system of claim 9, wherein reducing the differences in the total length and the total number of bends balances transmission loss and phase shifting of optical signals transmitted through the optical waveguides.

11. The system of claim 9, wherein the processor routes the paths by:
forming a grid of cells, wherein the cells are square-shaped and wherein each side of each cell corresponds to one unit of length and is twice as long as a fixed bend radius set for all bends in the optical waveguides;
establishing the boundaries of the rectangular-shaped area along lines on the grid;
placing the first and second input/output nodes for the optical waveguides on the grid such that all first input/output nodes are at grid points on one side boundary of the rectangular-shaped area and all second input/output nodes are at grid points on an adjacent side boundary of the rectangular-shaped area; and
routing the paths along lines of the grid such that each path between a first input/output node and a second input/output node represents a shortest route with a smallest number of ninety degree turns, wherein each ninety degree turn corresponds to one bend.

12. The system of claim 11, wherein the processor reroutes the paths in an iterative manner and wherein, for any specific path under consideration, makes insertions of additional linear segments and additional bends based on results of both an intersection operation between a set of all grid points on the specific path and a set of all corners of an identified cell that has at least one corner aligned with at least one bend in the specific path and an intersection operation between a set of all bends in the specific path and the set of all corners of the identified cell.

13. The system of claim 11, wherein the processor reroutes the paths by increasing a length of a specific path by:
scanning for a first cell that has at least one corner aligned with at least one bend in the specific path and that meets first conditions comprising: an intersection between a set of all grid points on the specific path and a set of all corners of the first cell equals two and an intersection between a set of all bends in the specific path and the set of all corners of the first cell equals two;
when the first cell is identified, dragging the specific path around the first cell effectively inserting two additional linear segments into the specific path to increase the total length by two units of length and maintain the total number of bends;
when no first cell is identified, scanning for a second cell that has at least one corner aligned with at least one bend in the specific path and that meets second conditions comprising: an intersection between the set of all grid points on the specific path and a set of all corners of the second cell equals two and an intersection between the set of all bends in the specific path and the set of all corners of the second cell equals one; and
when the second cell is identified, dragging the specific path around the second cell effectively inserting two additional linear segments and two additional bends into the specific path to effectively increase the total length by two units of length and the total number of bends by two.

14. The system of claim 11, wherein the processor reroutes the paths by increasing a number of bends in a specific path by:
scanning for a third cell that has at least one corner aligned with at least one bend in the specific path and that meets third conditions comprising: an intersection between a set of all grid points on the specific path and a set of all corners of the third cell equals three and an intersection between a set of all bends in the specific path and the set of all corners of the third cell equals one; and
when the third cell is identified, dragging the specific path around the third cell effectively inserting two additional bends into the specific path to increase the total number of bends by two and maintain the total length.

15. The system of claim 11, wherein the processor reroutes the paths by moving a specific path to provide additional space for further path route changes by:
scanning for a fourth cell that has at least one corner aligned with at least one bend in the specific path and that meets fourth conditions comprising: an intersection between the set of all grid points on the specific path and a set of all corners of the fourth cell equals three and an intersection between the set of all bends in the specific path and the set of all corners of the fourth cell equals two; and
when the fourth cell is identified, dragging the specific path around the fourth cell so as to move the specific path while maintaining both the total length and the total number of bends.

16. The system of claim 11, wherein the processor generates the layout by reshaping all ninety degree turns within all of the balanced paths to form curved bends with the fixed bend radius.

17. A structure comprising:
a substrate; and
a waveguide bus on the substrate and comprising optical waveguides,
wherein the optical waveguides extend between corresponding first and second input/output nodes, respectively, that are separated by different distances,
wherein the optical waveguides comprise different combinations of linear sections and bends so that total lengths of the optical waveguides are within a threshold difference in numbers of units of length and so that total numbers of bends in the optical waveguides are equal, and
wherein one specific optical waveguide extending between first and second input/output nodes that are separated by a longest distance comprises a specific combination of linear sections and bends comprising a cascade of bends with a stepped shape.

18. The structure of claim 17, wherein the specific combination of linear sections and bends further comprises a longest linear section of all linear sections of all the waveguides, and wherein the longest linear section extends from a first input/output node to a first end of the cascade of bends.

19. The structure of claim 18, wherein the specific combination of linear sections and bends further comprises: an additional linear section extending from a second input/output node to a second end of the cascade of bends.

20. The structure of claim 17, wherein all bends in all of the waveguides have a fixed bend radius and wherein each unit of length is equal to two times the fixed bend radius.

* * * * *